United States Patent
Dembiak et al.

[11] B 3,914,356
[45] Oct. 21, 1975

[54] METHODS OF AND APPARATUS FOR CONTROLLING THE THICKNESS OF AN ANNULAR EXTRUSION

[75] Inventors: Matthew R. Dembiak, Clifton; John J. Glosek, Roselle, both of N.J.

[73] Assignee: Western Electric Co., Inc., New York, N.Y.

[22] Filed: Mar. 28, 1974

[21] Appl. No.: 455,775

[44] Published under the Trial Voluntary Protest Program on January 28, 1975 as document no. B 455,775.

[52] U.S. Cl. .......... 264/40; 235/151.1; 235/151.32; 425/113; 425/140
[51] Int. Cl.² ........................................... B29C 3/06
[58] Field of Search ...... 264/40; 425/113, 140, 150; 235/151.1

[56] References Cited
UNITED STATES PATENTS

| | | | |
|---|---|---|---|
| 3,290,995 | 12/1966 | Pull | 264/40 X |
| 3,504,395 | 4/1970 | MacPherson | 425/71 |
| 3,599,288 | 8/1971 | Eakman | 425/141 |
| 3,635,620 | 1/1972 | Brown | 425/113 |
| 3,728,058 | 4/1973 | Wheeler | 425/144 |

*Primary Examiner*—Eugene G. Botz
*Attorney, Agent, or Firm*—W. O. Schellin

[57] ABSTRACT

A cable core advances through an extruder head and then past an ultrasonic test set. In the extruder head, an annular plastic jacket is formed about the core. The test set generates four signals which correspond in magnitude to the jacket thickness in orthogonally spaced quadrants of the jacket. The signals are then applied to apparatus for centering the core with respect to the extruder head. Additional apparatus generates control signals in response to the signals from the test set. The control signals are applied to a mechanism for adjusting the jacket thickness in diametrically opposite quadrants with respect to the thickness in the quadrants adjacent thereto to control the uniformity of the jacket thickness. The control signals are also applied to a mechanism for controlling the overall jacket thickness. The signals give priority to the function of controlling the uniformity of the jacket thickness before the overall jacket thickness is reduced to a predetermined thickness range. A special control signal overrides other signals for controlling the jacket thickness and causes an increase in the overall jacket thickness whenever the jacket thickness in any of the quadrants falls below a predetermined minimum thickness.

15 Claims, 11 Drawing Figures

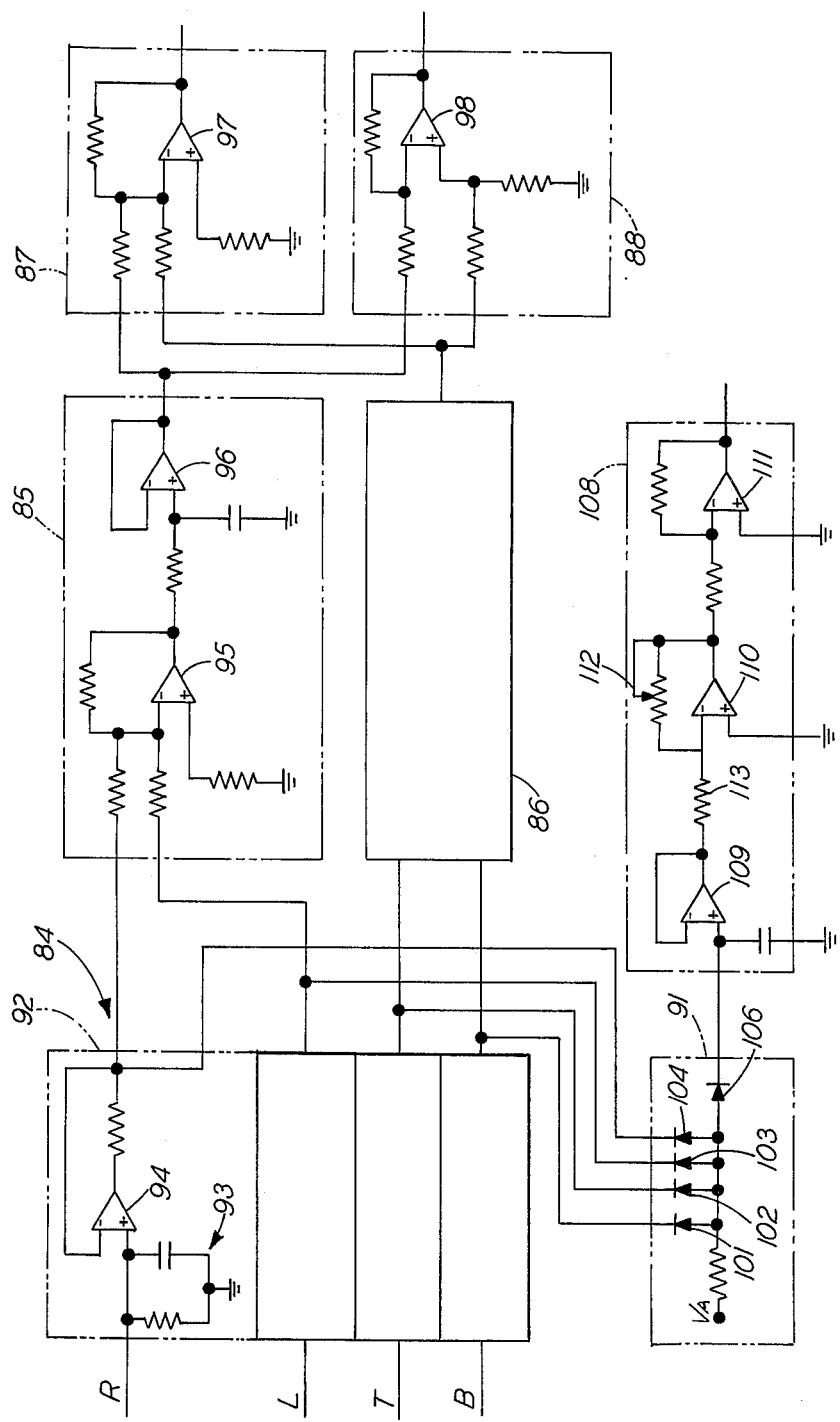

METHODS OF AND APPARATUS FOR CONTROLLING THE THICKNESS OF AN ANNULAR EXTRUSION

BACKGROUND OF THE INVENTION

1. Field of the Invention

The present invention relates to methods of and apparatus for controlling the thickness of an annular extrusion, and more particularly, to methods and apparatus for automatically controlling the uniformity and thickness of a plastic jacket extruded about an elongated article, such as, for example, a cable core.

2 Discussion of the Prior Art

Extruding a plastic sheath or jacket about an elongated metal core is a common practice in manufacturing cable. The jacket insulates the metal core and otherwise protects the cable from damage. In the manufacture of such a jacketed cable, it is desirable, for various reasons, to accurately control the thickness of the extruded jacket. The danger of a thin jacket lies in insufficient protection of the core. bare metal, or even only a jacket thickness below a predetermined minimum is not tolerable. On the other hand, a thick jacket is unnecessary and wasteful, and it also increases the manufacturing costs of the cable. It is, therefore, desirable to control the thickness of the extruded jacket within tight tolerances.

Among known devices for measuring on a continuous basis the extruded thickness of the jacket, is an ultrasonic cable jacket thickness and eccentricity monitor. It is advantageously used in conjunction with the present invention since it affords the opportunity to monitor the thickness of each of the vertically and horizontally opposed quadrants of the jacket. Such an ultrasonic monitor is disclosed in applications, Ser. No. 268,961, filed July 5, 1972, now U.S. Pat. No. 3,827,287 in the names of Boggs, et al., and Ser. No. 268,973 filed July 5, 1972 in the names of Boggs, et al., assignors to the Western Electric Co., Inc.

Problems incurred in controlling the thickness have been dealt with by the prior art. For instance, an application, Ser. No. 296,505 filed Oct. 10. 1972 in the names of A. M. isley, et al., assignors to the Western Electric Co., Inc., discloses an apparatus for centering the cable core with respect to an extrusion orifice, to control the eccentricity of the cable core with respect to the extruded jacket. Controlling the eccentricity of the core with respect to the jacket equalizes the jacket thickness in diametrically opposite quadrants of the jacket, and consequently permits tighter control of the jacket thickness without danger of exposing the core in one quadrant whle the jacket becomes excessively thick in the opposite quadrant.

However, the jacket thickness may also be nonuniform when the cross-sectional shape of the cable core is different from the shape of the extrusion orifice. For instance, the cable core may have an oval or elliptical cross section. If the extrusion orifice is substantially circular, then the space between the outer surface of the core and the inner surface of the extrusion orifice varies between adjacent quadrants. As a result, the extruder jacket may be thinner, for instance, in the top and bottom quadrants with respect to the left and right quadrants.

It is known in the art to vary the shape of the core by what is known as rounding rollers. Two counteracting rollers exert a pressure to two opposite sides of the core to decrease the diameter of the core in one direction and to increase the diameter of the core in the direction where no pressure is exerted. Two sets of these rounding rollers acting in directions perpendicular to each other are capable of changing the cross section of the core from an ellipse with its major axis in a first direction to an ellipse with its major axis in a direction perpendicular thereto.

However, changing the shape of the core to increase the uniformity of the jacket thickness requires constant attention of an operator. Frequently, nonuniformity of the jacket thickness is not discovered until after the thickness in one of the quadrants of the jacket has fallen below a desirable minimum value.

SUMMARY OF THE INVENTION

It is, therefore, an object of the invention to provide new and improved methods of and apparatus for controlling the uniformity of the thickness of an annular extruded article.

It is another object of the invention to provide methods of and apparatus for automatically controlling the average thickness of quadrants of an annular extruded article opposite one another with respect to the average thickness of quadrants adjacent thereto.

It is still another object of the invention to minimize differences in the wall thickness between adjacent quadrants of an annular extruded article.

Another object is to reduce the thickness of an annular extruded article to an optimum thickness.

A further object of the invention is to maintain the thickness in any quadrant of an annular extruded article above an established minimum thickness.

Consequently, the invention relates to new and improved methods of and apparatus for extruding an elongated article, and includes controlling the wall thickness of an extruded annular article. Accordingly, first and second signals are generated which are, respectively, indicative of (1) an increase of the average value of the wall thickness in diametrically opposite quadrants of the article with respect to the average value of the wall thickness in the other two quadrants beyond a predetermined acceptable range of values, and (2) a deviation of the average value of the wall thickness from a predetermined thickness range. The first signals are applied to a first mechanism for controlling the uniformity of the wall thickness of diametrically opposite quadrants adjacent thereto. The first mechanism, in response to the application of the first signals, increases the uniformity of the wall thickness. The second signals are applied to a second mechanism which controls the average wall thickness of the article. In response to the second signals, the second mechanism varies the average thickness of the article to a value within the thickness range. The second signals are blocked from being applied to the second mechanism when the first signals are being applied to the first mechanism and the average wall thickness exceeds the values of the thickness range.

BRIEF DESCRIPTION OF THE DRAWING

The objects and novel aspects of the present invention are more readily understood from the following detailed description thereof, when read in conjunction with the accompanying drawing, wherein:

FIG. 5 is a schematic diagram of some circuits of a processor unit of the control set of FIg. 4;

DETAILED DESCRIPTION

General Description of the Overall Function of the Extrusion Apparatus

Figure 1:
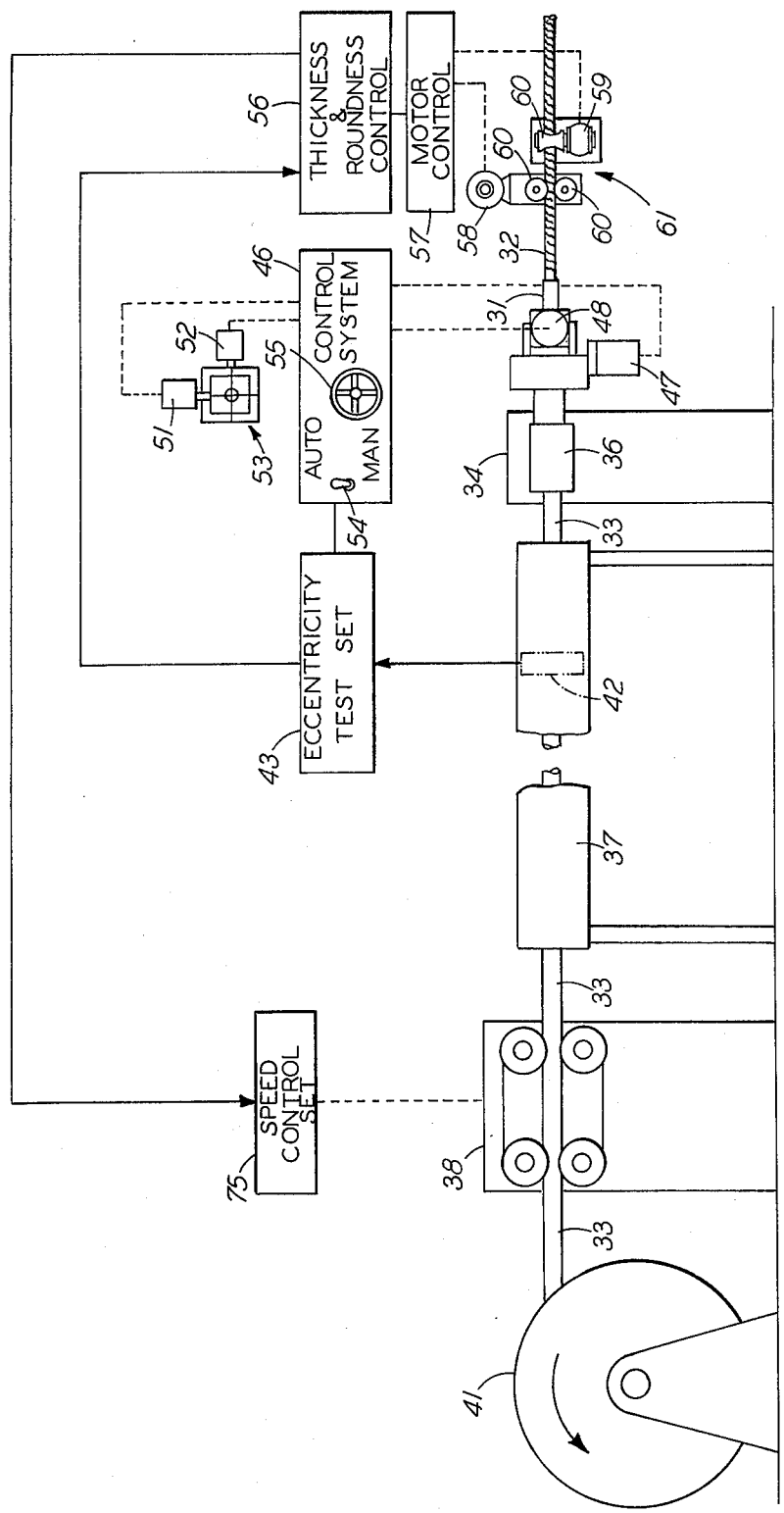
FIG. 1 is a simplified side elevation of an extrusion apparatus and a control system therefor, for extruding a plastic jacket about a longitudinally advancing core, in accordance with the present invention.

Referring now to FIG. 1, a tubular covering or jacket 31 is formed around an elongated article, such as a cable core 32, to form a jacketed cable 33. The material of the jacket 31 may be of an electrically insulated plastic material, such as, for example, polyethylene.

The jacket 31 is formed or extruded around the core 32 by a horizontal extruder 34 as the core 32 exits from a crosshead 36 of the extruder. Thereafter, the now jacketed cable 33 passes through an elongated cooling trough 36. A capstan 38 pulls the cable 33 through the trough 37 and pushes it toward and onto a takeup reel 41.

A sensing means 42, preferably located within the cooling trough 37, measures the thickness of the jacket 31 in each of the four quadrants of a section through the cable 33 transverse to its longitudinal axis. Though the present invention is not limited by a particular means for measuring the thickness of the jacket 31, preferably an ultrasonic cable jacket thickness and eccentricity monitor is used, such as the one disclosed in the aforementioned applications Ser. No. 268,961 and Ser. No. 268,973. The monitor of these applications is capable of measuring the wall thickness of the jacket 31 immediately following the extrusion. Because the monitor is ultrasonic, measurements can be made on the cable without physical contact between the monitor and the jacket 31. Since the cooling fluid in the trough 37 provides an excellent coupling medium for the monitor, the sensing means is ideally located in the trough 37 adjacent to the crosshead 36, where undesirable deviations from a desired jacket thickness are detected immediately after the extrusion of the jacket around the core 32.

Thus, the sensing means 42, in a preferred embodiment, employs ultrasonic techniques. The output from the means 42 is coupled to an eccentricity test set 43 which feeds back the monitored information to an extruder control system 46. The control system 46 automatically drives first and second stepping motors 47 and 48 to selectively vary the position of a pivotally mounted forming member disposed within the crosshead 36. Varying the position of the forming member corrects any eccentricities of the jacket 31 with respect to the core 32. Third and fourth stepping motors 51 and 52 are slaved to the first and second stepping motors 47 and 48 to adjust a visual display 53 of the relative position of the forming member within the crosshead 36. A selector switch 54 permits a shifting of the system 46 from the automatic mode to a manual mode wherein a lever 55 may be used to center the forming member in the crosshead 36. A detailed description of the operation of the sensing means 42, the eccentricity test set 43 and the control system 46 to control the eccentricity of the jacket 31 is contained in the aforementioned Isley et al., application, the subject matter of which is incorporated herein by reference and made a part hereof.

Information on the jacket thickness in each of the four measured quadrants is also fed from the eccentricity test set to a thickness and roundness control set 56. The set 56 functions to maintain the thickness of the jacket 31 at or near a desired optimum value. In doing so the set 56 (1) controls the uniformity of the jacket thickness between adjacent quadrants of the jacket 31, and (2) controls the average thickness of the jacket 31.

The jacket thickness between adjacent quadrants of the jacket 31 is changed or equalized, according to the preferred embodiment, by changing the shape of the core 32 before it enters the crosshead 36 of the extruder 34. The control set 56 selectively controls, through a standard, commercially available motor control circuit 57, two rounding motors 58 and 59 which drive pressure rollers 60 of a rounding mechanism 61. The rounding mechansim 61, when actuated by the motors 58 and 59, is capable of varying the roundness of the core 32 from an elliptical shape having a major axis in the horizontal direction to an elliptical shape having a major axis in the vertical direction. Of course, the position of the axes of the pressure rollers 60 determine the actual direction in which the shape of the core can be formed or altered. Choosing the vertical and horizontal directions from the axes of the pressure rollers 60 establishes a correspondence between the direction of these axes of the rounding mechanism 61 and the principal axes on which thickness measurements of the jacket 31 are taken.

Figure 2:
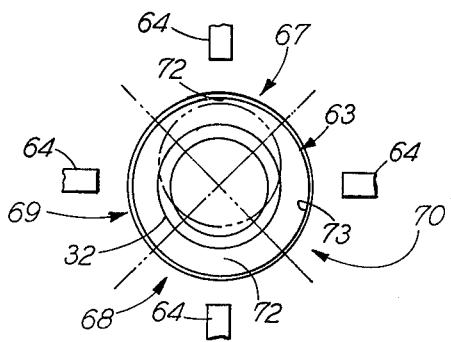
FIG. 2 is a cross section of an extrusion orifice of the apparatus of FIG. 1, illustrating the effects of the eccentricity of the core with respect to the orifice.
Figure 3:
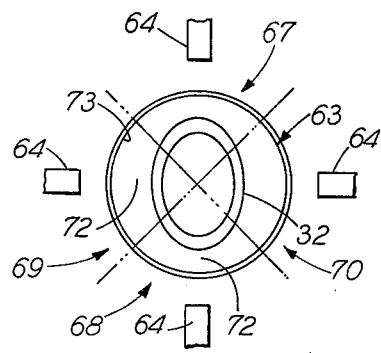
FIG. 3 is a cross section of the orifice of FIG. 2, showing the effects of an elliptic cross section of the centered core advancing through the orifice.

A brief reference to FIGS. 2 and 3 further clarifies the operation of and the difference between the eccentricity control system disclosed in the above-identified application in the names of Isley, et al., and the rounding mechanism 61. FIG. 2 is a schematic sectional view of the core 32 in relation to an extrusion orifice 63 of the cross head 36. Shown in relation therewith are four ultrasonic sensing probes 64 of the sensing means 42. The arrangement of the probes 64 is such that the jacket 31 is measured respectively in a top and bottom quadrant 67 and 68, and in a left and right quadrant 69 and 70. Whenever the core 32 is centered with respect to the extrusion orifice 63, a space 72 in any of the quadrants 67–70, between an inner wall 73 of the orifice 63 and the core 32 is substantially equal to the corresponding space 72 in the respectively diametrically opposite quadrant. Thus, the space 72, for instance, is equally wide in the top and bottom quadrants 67 and 68, and then, again, in the left and right quadrants 69 and 70.

Any deviation of the core 32 from the center of the orifice 63 increases the width of the space 72 in at least one of the quadrants. For instance, the alternately positioned core 32, shown in phantom lines in FIG. 2, results in an increase in the width of the space 72 in the bottom quadrant 68 and in a corresponding decrease in the width of the space 72 in the opposite top quadrant 67. Such a deviation of the core 32 from the center of the orifice 63 ultimately results in a decreased thickness of the extruded jacket 31 in the top quadrant 67 and a correspondingly increased thickness of the jacket in the bottom quadrant 68. These differences in the jacket thickness are recognized and corrected by the system disclosed in the aforementioned Isley, et al., application.

Referring now to FIG. 3, there is shown a section of the core 32 which is centered with respect to the orifice 63. Consequently, the space 72 in each of the quadrants 67 through 70 is equal to the space 72 in each respectively opposite quadrant. Therefore, the concentricity requirements for the core 32 with respect to the extrusion orifice 63 are satisfied. However, because the cross section of the core 32 is oval or elliptical, the width of the space 72 in none of the quadrants is equal to the space 72 in any of its adjacent quadrants. Consequently, the thickness of the extruded jacket 31 would also vary in thickness between adjacent quadrants, such as, for instance, between the top and left quadrants 67 and 69. The disclosed thickness and roundness control set 56 controls the jacket thickness to equalize a difference in the thickness between adjacent quadrants by controlling the rounding mechanism 61 in response to the information on the jacket thickness in each of the quadrants as received from the eccentricity test set 43.

A second function of the thickness and roundness set 56 is to provide a control signal for maintaining the average thickness of the jacket 31 at a desired optimum value. Since the average jacket thickness is adjustable by varying the extrusion rate of the jacket material with respect to the linear advance of the core 32 through the crosshead 36, it is possible to change the average thickness by either varying the material being extruded through the crosshead 36, or by changing the linear advance of the core 32 through the crosshead. Preferably, to control the average thickness of the extruded jacket 31, the thickness and roundness control set 56 is coupled to a speed control set 75, which, in turn, varies the speed of the capstan 38. In normal operation of the set 56 a continuous control signal of varying voltage is passed to the set 75 to either maintain the current speed of the capstan 38, or to increase or decrease its speed as required to maintain the jacket thickness at an optimum desired average value.

Adjusting the average thickness of the jacket 31 to a desired optimum thickness, and controlling the uniformity of the thickness of the jacket 31 in adjacent quadrants can be carried out according to the present invention independently and in addition to any adjustments made to the eccentricity of the core 32 with respect to the extrusion orifice 63. A number of control functions are therefore generated by the thickness and roundness control set 56 which establish priority for controlling the thickness of the jacket 31, and which also establish an alarm condition should the control set 56 encounter extrusion conditions which are uncorrectable.

General Description of the Thickness and Roundness Control Set 56

Figure 4:
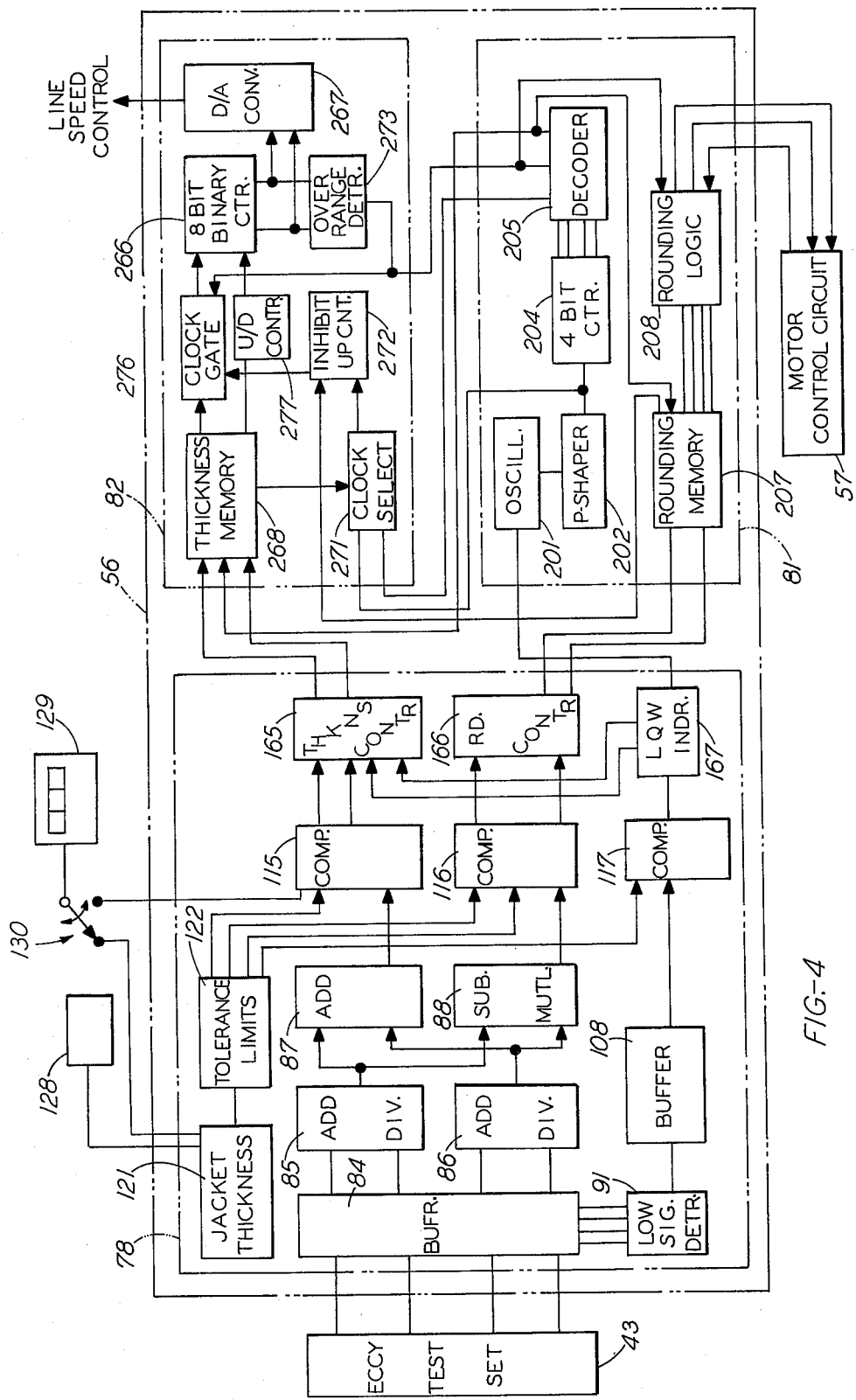
FIG. 4 is a schematic flow diagram of a thickness and roundness control set of the apparatus of FIG. 1, illustrating how the control set functions more particularly in accordance with the present invention.

Referring now to FIG. 4, the thickness and roundness control set 56 includes three basic modules or units. A signal processor unit 78 initially receives information signals from the eccentricity test set 43. There are four distinct information or quadrant signals received from the test set 43. Each quadrant signal is an analog voltage signal, the magnitude of which corresponds to the thickness of the jacket 31 in one of its quadrants about the core 32.

The quadrant signals are processed and binary decision signals are generated. The decision signals referred to as roundness signals and thickness signals, respectively, indicate whether (1) the average thickness of the jacket 31 between one set of opposite quadrants of the jacket 31 is equal to the average thickness of the jacket of the other, or whether, for example, the left and right quadrants of the jacket 31 are too thick with respect to the top and bottom quadrants of the jacket; and (2) the averge thickness of the jacket 31 conforms to an established standard thickness range, or the average thickness falls either above or below such range. The roundness signals are applied to a roundness control unit 81, and the thickness signals are applied to a thickness control unit 82. The roundness control unit 81 and the thickness control unit 82, in turn, generate control signals to regulate the rounding mechanism 61 and the speed control set 75, respectively.

The Signal Processor Unit 78

The signal processor unit 78 receives the quadrant signals from the eccentricity test set 43. The signals are applied to the processor unit 78 through a bank 84 of filter-buffers. Adder circuits 85 and 86 average the quadrant signals of the right and left quadrant 70 and 69, and those of the top and bottom quadrants 67 and 68, respectively. An added circuit 87 further sums the output signals of the circuits 85 and 86. A multiplication factor gives the output from the adder circuit 87 the true average value of the quadrant inputs.

A difference in the jacket thickness of adjacent quadrants determines whether the shape of the core 32 has to be altered with respect to the extrusion orifice 63. A subtraction-multiplication circuit 88 subtracts the output signal of the adder circuit 85 from the output signal from the adder circuit 86. The resulting signal corresponds to the average value of the jacket thickness of the right and left quadrants subtracted from the average value of the jacket thickness of the top and bottom quadrants. A multiplication factor produces an output that is indicative of the true value of the difference between the average top and bottom thickness and the averaged right and left thickness of the jacket 31.

The processor unit 78, in addition to averaging the quadrant signals and generating a signal indicative of a variation in values of the jacket thickness in adjacent quadrants, also detects through a low-signal detector circuit 91 the lowest value of the quadrant signals. The low quadrant signal is used to generate an alarm signal should the thickness in any one of the quadrants of the jacket 31 fall below a minimum safe value.

FIG. 5 illustrates in greater detail the circuits of the processor unit 78. In particular, a typical buffer 92 of the buffer bank 84 includes an RC filter circuit 93 and a conventional operational amplifier 94 which is used in a well-known manner as a buffer element. The quadrant signals pass through a respective one of the buffers 92 and are then applied to the input leads of one of two adder circuits 85 and 86.

The adder circuit 85 includes an operational amplifier 95 which is used in a conventional manner as an adder-inverter with a multiplication factor to have an output signal of one-half the average thickness value of the right and left quadrants. The adder circuit 86 is physically identical to the adder circuit 85. Its output signal corresponds to one half of the average value of the thickness of the jacket 31 in the top and bottom quadrants 67 and 68. The adder circuit 87 includes an operational amplifier 97 and resistive input-feedback circuitry to add and invert the outputs from both the adder circuits 85 and 86. Consequently, the resulting output signal from the adder circuit 87 corresponds to the average value of the jacket thickness in all four quadrants 67 through 70.

The subtracting circuit 88 includes an operational amplifier 98 and resistive input and feedback elements to impart to the output signal of the amplifier 98 a gain of two. The resulting output signal corresponds to the subtraction of the average value of the top and bottom quadrant signals from the average value of the right and left quadrant signals.

The low signal detector circuit 91 includes diodes 101 through 104 which are arranged in parallel. The quadrant signal voltage applied to the cathode of each of these diodes will tend to reverse bias the diode junction to make it nonconductive. However, a forward bias voltage applied through a resistor 105 to each of the anodes of the diodes tends to overcome the reverse bias voltage from the quadrant signal to forward bias at least one of the diodes to make it conductive. Of course, the diode having the lowest reverse bias voltage is the first diode to become conductive. Once one of the diodes 101–104 is conductive, the forward bias voltage remains clamped to voltage level of the lowermost quadrant signal. A diode 106 merely compensates for the forward bias voltage drop of the respective input diode to adjust the voltage level at the cathode of the diode 106 to substantially the voltage of the quadrant signal having the lowermost voltage level. The output of the low signal detector circuit then passes through a buffer and gain adjustment circuit 108. The buffer and gain adjustment circuit 108 includes a series connection of three amplifiers 109 through 111 which serve primarily as buffers. However, the amplifier 110 includes in its feedback loop a potentiometer 112 which, in combination with the resistor 113, permits the output voltage of the buffer 108 to be precisely matched to a known voltage input. The accuracy of the output signal from the buffer 108 with respect to an input signal into the processor unit 78 is important in that the low quadrant output represents a low thickness of the jacket 31 and requires an immediate corrective action.

The average jacket thickness, the difference between the jacket thickness in adjacent quadrants, and the quadrant signal having the lowermost value are now compared with standard values and tolerances to determine whether or not they are acceptable. Three comparator circuits 115, 116 and 117 relate the output signals from the circuits 87, 88 and 108 to a predetermined standard jacket thickness, a range in terms of a percentage of the standard jacket thickness, and a minimum standard thickness, respectively.

The optimum desired value for the jacket thickness is established as a standard in an adjustable reference circuit 121. Its output corresponds to the standard or maximum thickness value of an acceptable thickness range within which the thickness and roundness control set 56 tends to maintain the average jacket thickness. The standard thickness value and a value reduced by a percentage thereof establish upper and lower tolerance limits within which the jacket thickness may vary without requiring continuous corrective action by the circuit 56. The output of the thickness reference circuit 121 is consequently coupled to a circuit 122 for establishing tolerance limits. From the circuit 122 the standard jacket thickness is applied to the comparator 115 which relates the actual average jacket thickness to the standard thickness value and its tolerance range. A positive and negative limit, in terms of a negative and positive percentage of the standard thickness applied to the comparator 116 establishes a dead band within which the thickness of adjacent quadrants or jacket uniformity may vary without requiring corrective action by the set 56. Another signal, the minimum standard thickness, corresponding to a jacket thickness which approaches a point where a cable will be rejected, is applied to the comparator 117 and related to the low quadrant signal.

Figure 6:
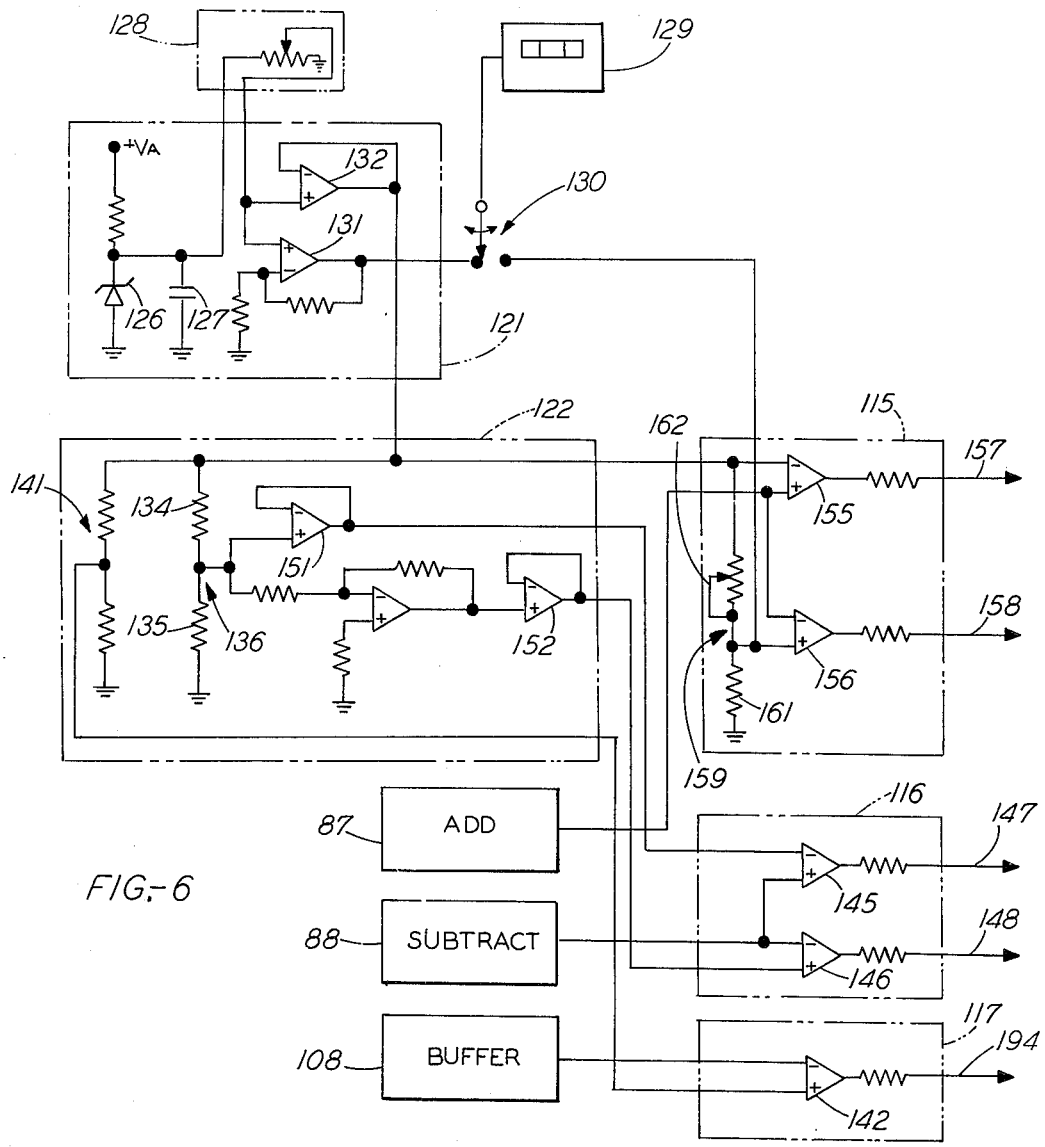
FIG. 6 is a schematic diagram of a portion of the processor unit, wherein input signals are compared to pre-established standard signals.

FIG. 6 more clearly illustrates the comparator and thickness reference and tolerance circuits. The thickness value is derived from a regulated voltage supply which is clamped to precise voltage by a Zener diode 126 coupled in parallel to a capacitor 127. An external potentiometer 128 permits a precise adjustment of the voltage to a value less than that of the Zener breakdown voltage. An external digital voltmeter 129 is connected through a switch 130 to the output of the amplifier 131. The gain of the amplifier 131 is chosen to permit an operator to read a value shown on the digital voltmeter 129 as a direct reading of the desired thickness of the jacket 31 as, for instance, in mils or any other desired measurement unit. The adjusted signal passes a buffer amplifier 132 and is then applied to the circuit 122 for establishing desired tolerance limits. Tolerance limits in the circuit 122 are established by using voltage dividers in a conventional manner. This has a particular advantage in that the standard thickness applied to the circuit 122 serves as a reference for the desired tolerance values and such values remain fixed percentages of the established standard jacket thickness.

For instance, resistors 134 and 135 of the voltage divider 136 are chosen to yield at the output 5 percent of the input voltage. If the potentiometer 128 is adjusted to vary the standard jacket thickness to a higher value, the tolerance established by the voltage divider 136 nevertheless remains 5 percent.

The output of the voltage divider 136 is inverted to establish an inverted signal as a negative tolerance limit. As previously mentioned, a preferred value for the tolerance value is 5 percent; however, it should be understood that this is merely a desired value for a particular application. Other values may be substituted by changing the values of the resistors 134 and 135 in accordance with the known art.

A second voltage divider 141 establishes at its output a voltage which is 10 percent below the voltage corresponding to the standard jacket thickness and the output of the voltage divider 141 corresponds to the maximum downward deviation from the minimum standard thickness or standard thickness value before an alarm condition is reached. The output from the voltage divider 141 is applied to the positive input terminal of an amplifier 142 of the comparator circuit 117. The output from the buffer circuit 108 is applied to the other negative terminal of the amplifier 142. As long as the output from the buffer circuit 108 remains more positive than the minimun standard thickness, the output from the comparator circuit 117 remains negative.

The comparator circuit 116 includes two amplifiers 145 and 146 with two parallel output terminals or leads 147 and 148, respectively. The established positive tolerance from the voltage divider 136 is applied through a buffer amplifier 151 to the negative input terminal of amplifier 145. The output signal from the subtracting circuit 88 corresponds to the subtraction of the average value of the top and bottom quadrants from the average value of the right and left quadrants. This output signal is applied to the positive input terminal of the amplifier 145 and to the negative input terminal of the amplifier 146. As long as the output signal from the subtracting circuit 88 remains less positive then the established positive tolerance applied to the amplifier 45, the output of the amplifier 45 remains negative. Should, however, the output from the subtracting circuit 88 become more positive then the positive tolerance limit, the output of the amplifier 145 then becomes positive indicating a nonuniform thickness in that the thickness in the right and the left quadrants exceeds the thickness of the top and bottom quadrants by more than 5 percent of the standard jacket thickness. Also, as long as the output signal from the subtracting circuit 88 remains more positive than the negative tolerance applied to the amplifier 146, the output signal of the amplifier 146 remains negative. Should, however, the output signal from the subtracting circuit 88 become more negative than the negative tolerance applied to the amplifier 146, then the output signal of the amplifier 146 at the output lead 148 will become positive indicating that the top and bottom quadrants of the jacket 31 are thicker than the right and left quadrants by more than five percent of the established optimum jacket thickness.

The comparative circuit 115 includes two amplifiers 155 and 156 with two parallel output terminals or leads 157 and 158, respectively. The standard jacket thickness is applied to the negative input terminal of the amplifier 155. This thickness value is also applied to a voltage divider 159 of which the total resistance of a resistor 161 and a potentiometer 162 is adjusted so that the output signal of the voltage divider 159 when applied to the positive terminal of the amplifier 156 corresponds to a value of about 95 percent of the selected optimum thickness value of the jacket 31. In adjusting the potentiometer 162, the switch 130 is thrown to connect the voltmeter 129 to the output of the voltage divider 159.

The output from the adder circuit 87, e.g., the average thickness value of the jacket 31, is applied to the positive terminal of the amplifier 155 and to the negative terminal of the amplifier 156. As long as the output signal of the adder circuit 87 remains within a tolerance established by the standard thickness applied to the negative terminal of the amplifier 155 and the lower limit established by the output signal of the voltage divider 159 applied to the positive terminal of the amplifier 156, both output signals 157 and 158 of the comparator circuit 115 remains negative. A positive output signal on the terminal 157 indicates that the average thickness of the jacket 31 is exceeding the standard thickness. A positive output signal on the terminal 158 of the comparator circuit 115 indicates the average jacket thickness has fallen below the lower limit set by the voltage divider 159.

Figure 7:
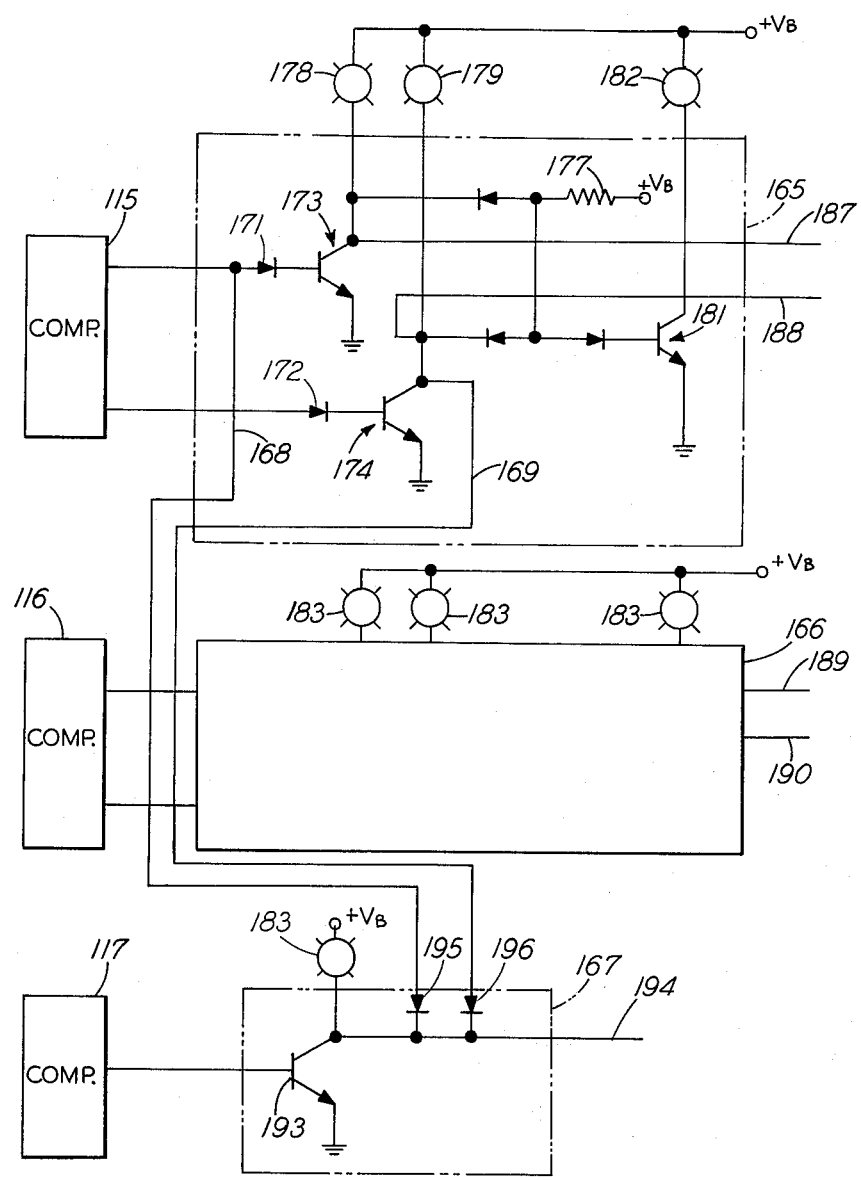
FIG. 7 is a schematic diagram of indicator circuits in the processor unit.

Referring now to FIG. 7, the output signals from the comparator circuits 115, 116 and 117 are applied to a thickness control indicator circuit 165, to a roundness control indicator circuit 166 and to a low quadrant warning indicator circuit 167, respectively. With respect to the output signals from the comparator circuits 115–117 the circuits 165 through 167 are inverter circuits.

With one exception, the thickness control indicator circuit 165 is identical to the roundness control indicator circuit 166. The exception is a pair of interconnecting leads 168 and 169 between the low quadrant warning indicating circuit 167 and the circuit 165.

The output signals 157 and 158 are coupled through diodes 171, 172 to the bases of transistors 173 and 174, respectively. Both transistors 173, 174 have their emitter terminals coupled to ground and their collector terminals coupled through a resistor 177, to a positive bias voltage $V_B$. The collector voltages of the transistors 173 and 174 are the inverse of the output signals of the circuits 165. A high input to the base of the transistor 173, for instance, turns on the transistor and causes the collector voltage to go to ground. On the other hand, a low input signal to the base of the transistor 173 causes the transistor to turn off and raise the collector voltage to $V_B$.

A low collector voltage exists at either of the two transistors 173 and 174 whenever the jacket thickness is either greater or less than the established tolerances. Visual indicators 178 and 179 are coupled in parallel between the positive bias voltage and the collectors of the transistors 173 and 174, respectively. A low voltage at the collector of either transistor 173 or 174 turns on the corresponding visual indicator 178 or 179. It should be noted that any out-of-tolerance conditions of the jacket thickness which affect the transistors 173 and 174 are mutually exclusive of each other. The average thickness of the jacket 31 can be either too great or too small but it cannot be both. Similarly, with respect to the circuit 166 only one of two possible conditions can exist simultaneously. Either the right and left quadrants 70 and 69 of the jacket 31 are thicker than the respective top and bottom quadrants 67 and 68, or the top and bottom quadrants are thicker than the right and left quadrants. Thus, only one of the visual indicators 178 or 179 can, at any one time, indicate an out-of-tolerance condition.

If the thickness of the jacket 31 falls within the established tolerance ranges, both collector terminals are held at $V_B$ and no current flows through either of the visual indicators 178 and 179. The high voltage on both collector terminals of the transistors 173 and 174 raises the voltage of the negative-going terminal of the resistor 177 to $V_B$. As a result, a positive bias voltage is applied to the base of a third transistor 181. The transistor 181 turns on and provides a current path for a third visual indicator 182. Thus, whenever the control set 56 is operating, one and only one of the visual indicators 178, 179, 182 is turned on, either to indicate a particular out-of-tolerance condition, or to indicate that no out-of-tolerance condition exists on the jacket 31. If none of the indicators are turned on, a malfunction in the control set 56 or a malfunctioning indicator can be expected to exist. The indicators 178, 179, 182 similar indicators 183 on the roundness control indicator set 166, or a single indicator 183 can be properly selected filament lamps or other types of indicators such as, for instance, light emitting diodes. It may be desirable to mount these indicators in a front panel (not shown) of the control set 56 or near their respective circuits. Advantageously, the indicatos 178, 179, 182, 183 can be located near each circuit and in thr front panel for easy reference, coupled by parallel circuit connections.

The circuit 166, as previously discussed is substantially identical to the described circuit 165. Both circuits 165 and 166 have normally high signal outputs on both output leads (187, 188 and 189, 190 respectively) whenever the jacket 31 is maintained within the respective established tolerance ranges. In the event that an out-of-tolerance condition does occur, a low signal appears at the respective one of the leads 187-190.

The output signal from the comparator 117 is coupled to the base of a transistor 193 of the circuit 167. A positive bias voltage is applied through the indicator 183 to the collector of the transistor 193. Electrical continuity through the indicator 183 provides current to the collector of the transistor 193 whenever the transistor is turned on by a positive signal appearing at its base. The normally low signal level applied to the gate of the transistor 193 from the circuit 117 maintains a normally high voltage signal at the collector of the transistor 193. The collector signal voltage is coupled to the output terminal 194 of the circuit 167.

Whenever the transistor 193 is turned off the indicator 183 is also turned off. Two diodes 195 and 196 are normally reversed biased and the normally high voltage signal appearing at the collector of the transistor 193 is nor applied to the circuit 165. However, a positive or high signal applied to the base of the transistor 193 results in a low signal at the collector of the transistor. This condition occurs whenever the low quadrant signal decreases below the minimum standard thickness, as determined by the circuit 117. The low signal at the collector of the transistor 193 turns on the indicator 183 and forward biases of the diodes 195 and 196, provided a high voltage signal exist at that time on the leads 168 and 169. Such a signal may exist, for instance, when the average jacket thickness is greater than the standard thickness. As a result, a corrective signal from the control set 56 would normally speed up the advance of the core 32 through the crosshead 36 to decrease the average thickness of the jacket 31. However, even though the average jacket thickness is greater than the standard thickness, a low value of the jacket thickness below the minimum standard thickness in any quadrant requires an immediate increase in the average jacket thickness. Should the jacket thickness decrease even more, the cable may have to be rejected.

Consequently, whenever the transistor 193 turns on, the low signal from its collector is applied through the leads 168 and 169 to the circuit 165 to override any signals from the comparator circuit 115 that would indicate that the average jacket thickness is either too great or within normal range. The low signal applied to the base of the transistor 173 turns off the transistor 173. The low signal applied to the collector of the transistor 174 applies a low signal to the output lead 188 of the circuit 165 and also causes the transistor 181 to turn off or to remain turned off whenever it is already turned off when the low quadrant signal occurs.

In summary, then, the signal processor unit 78 receives four signals, the quadrant signals, from the eccentricity test set 43, each of which corresponds to the jacket thickness measured in one of the quadrants about the jacket 31. These signals are processed and compared to established signals corresponding to a standard jacket thickness and to acceptable tolerance limits with respect thereto. Five separate outputs from the signal processing unit 78 indicates (1) whether or not on the average the jacket 31 is too thick, (2) whether or not on the average the jacket 31 is too thin, and (3) whether or not the jacket 31 is nonuniform, e.g., thicker in the right-left quadrant as compared to its top and bottom quadrants, (4) whether or not the jacket 31 is nonuniform in that it is thicker in the top and bottom quadrants with respect to the right and left quadrants, and (5) whether or not the jacket thickness in any of the four quadrants has fallen below a minimum standard thickness. These five output signals are applied either to the thickness control unit 82 or to the roundness control unit 81 as further described.

The Roundness Control Unit 81

Figure 8:
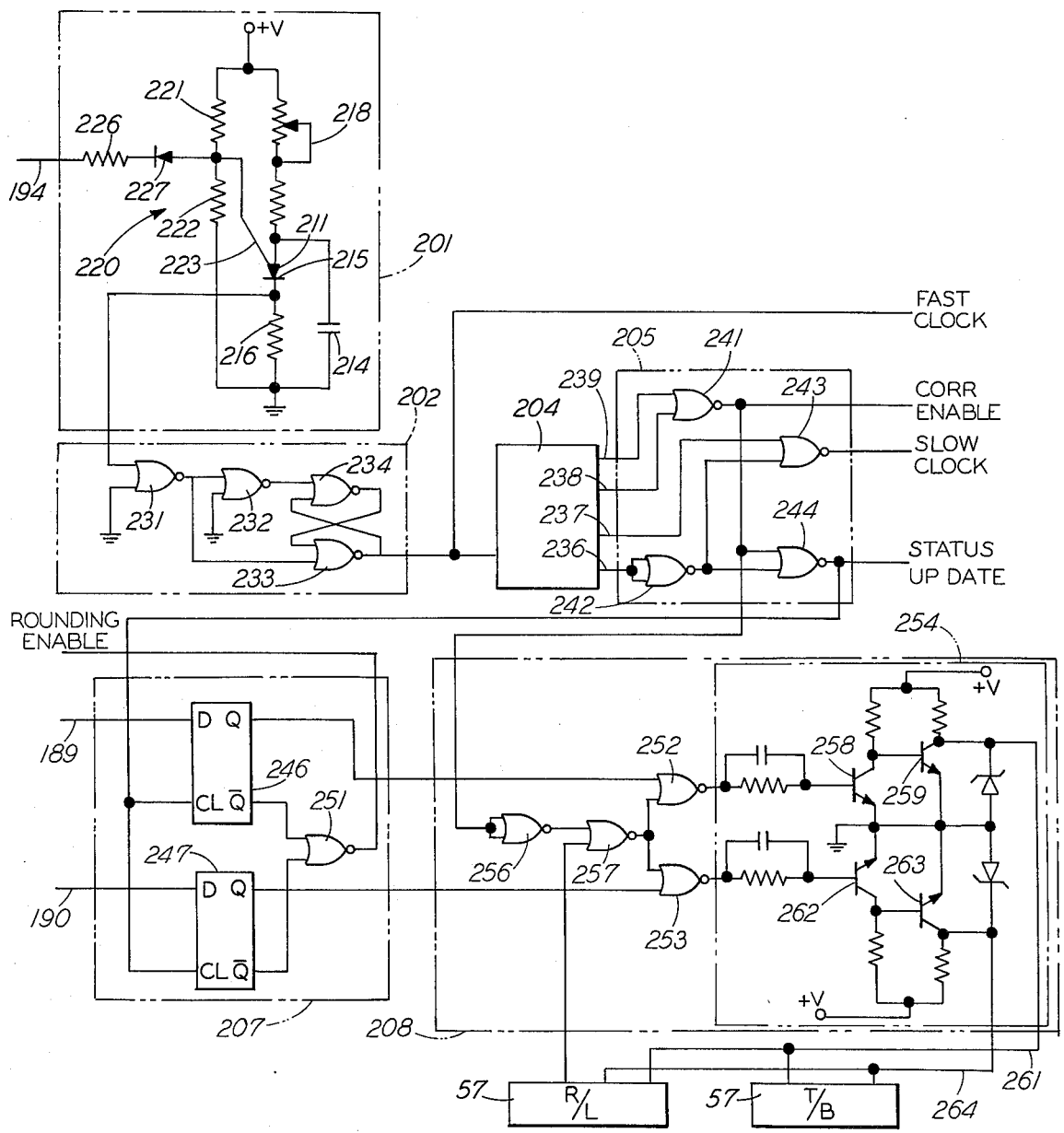
FIG. 8 is a schematic diagram of a roundness control unit of the control set of FIG. 4.

A major function of the roundness control unit 81 is to generate timing or clock pulses for both the unit 81 and for the thickness control unit 82. Referring to FIG. 8, the roundness control unit 81 includes a variable oscillator circuit 201 which feeds into a pulse shaper circuit 202. The clock pulses from the shaper circuit 202 are then applied to a four-bit counter which, according to its operation, is also referred to as a modulus 16 counter. The latter expression refers to a counter which counts binary code up to and including 15. The 16th count resets the counter to a zero count. The output from the counter 204 is applied to a decoding circuit 205 which has as its output signals several timed function pulses. These pulses are applied within the rounding control unit itself, and they are also unsed in sequencing certain functions in the thickness control unit 82.

A second major function of the rounding control unit 81 is the generation of control pulses which are then applied to the commercially available motor control circuit 57 which, in turn, controls thr rounding motors 58 and 59. Output signals from the roundness control indicator circuit 166 are stored in a rounding memory 207. The stored signals are then applied to a rounding control logic circuit 208. The rounding control logic circuit generates the controlled signals which are applied to the motor control circuit 57.

The active element of the variable oscillator circuit 201 is a programmable unijunction transistor 211 which is coupled with its anode 212 to a positive terminal of a capacitor 214. The other terminal of the capacitor 214, in turn, is coupled to ground. The cathode 215 of the transistor 211 is coupled through a resistor 216 to ground. The capacitor 214 is charged through a variable resistance 218 from a positive voltage source. The positive voltage source is also applied to a voltage divider which includes resistors 221 and 222. A gate 223 of the transistor 211 is coupled to the output of the voltage divider 220. In operation, the voltage on the capacitor 214 increases until the anode terminal 212 of the transistor 211 reaches the voltage which is supplied to the gate of the transistor by the voltage divider 220. At that time, the transistor turns full on and discharges the capacitor 214 through the resistor 216 to ground. While the transistor 211 is discharging the capacitor 214 through the resistor 216, a positive voltage appears at the anode terminal of the transistor. Upon discharge of the capacitor 214, the transistor 211 turns off and the capacitor 214 again charges to the point where the transistor again will turn on. As the transistor 211 continues to cycle through repeated operations, timed voltage pulses appear at the cathode 215 of the transistor. These voltage pulses or clock pulses represent the output of the oscillator circuit 201. The transitions of the clock pulses are now refined in the pulse shaper circuit 202 before they are used in the control units 81 and 82.

Once again, referring to the oscillator circuit 201, the clock rate of the circuit is determined by the charge time of the capacitor 214 to the trigger voltage applied at the gate 223 of the transistor 211. The exact cycle time of the oscillator circuit 201 is consequently adjustable by changing the variable resistance 218 which either increases or decreases the time required to charge the capacitor 214 to certain voltage level. However, the cycle time of the oscillator circuit 201 can also be altered by changing the values of the resistors 221 or 222, thereby altering the gate voltage or trigger voltage applied to the transistor 211.

The output signal from the low quadrant warning indicator circuit 167 is applied through the lead 194 to the oscillator circuit 201. The lead is coupled through a resistor 226 and through a diode 227 to the output of the voltage divider 220. The output of the voltage divider 220 is coupled to the anode of the diode 227. Consequently, a high input signal on the lead 194 reverse biases the diode 227. Such a reverse bias condition of the diode 227 does not affect the trigger voltage established by the voltage divider 220 including the resistors 221 and 222. However, in response to the presence of the low quadrant signal, the transistor 193 in the circuit 167 turns on and the normally positive output signal on the lead 194 goes to ground. A ground signal on the lead 194 forward biases the diode 227, and the resistor 226 is now switched into parallel with the resistor 222 of the voltage divider 220. As a result, the voltage output from the voltage divider 220 is decreased, and the trigger level to which the capacitor 214 has to be charged is correspondingly lower. The result is that the oscillating frequency of the circuit 201 is increased during the time that any quadrant of the jacket 31 falls below the minimum standard thickness.

The pulse shaping circuit 202 is comprised of NOR logic wherein two gates 231 and 232 are coupled in series as inverter gates and the outputs from the inverter gates 231, 232 are coupled to gates 233 and 234, respectively. The gates 233 and 234 are connected into a conventional latching circuit. The output pulses from the gate 233 are coupled directly to the counter 204 to drive the counter 204 in a conventional manner. As the counter 204 reaches its full count it resets itself to a zero count with the next clock pulse from the pulse shaper circuit 202.

The counting and resetting sequence of the counter 204 continues throughout the operation of the control set 56. The counter pulses from terminals 236, 237, 238 and 239 of the counter 204 are applied to the decoding circuit 205 to generate three distinct functions during each counting cycle of the counter 204.

Figure 9:
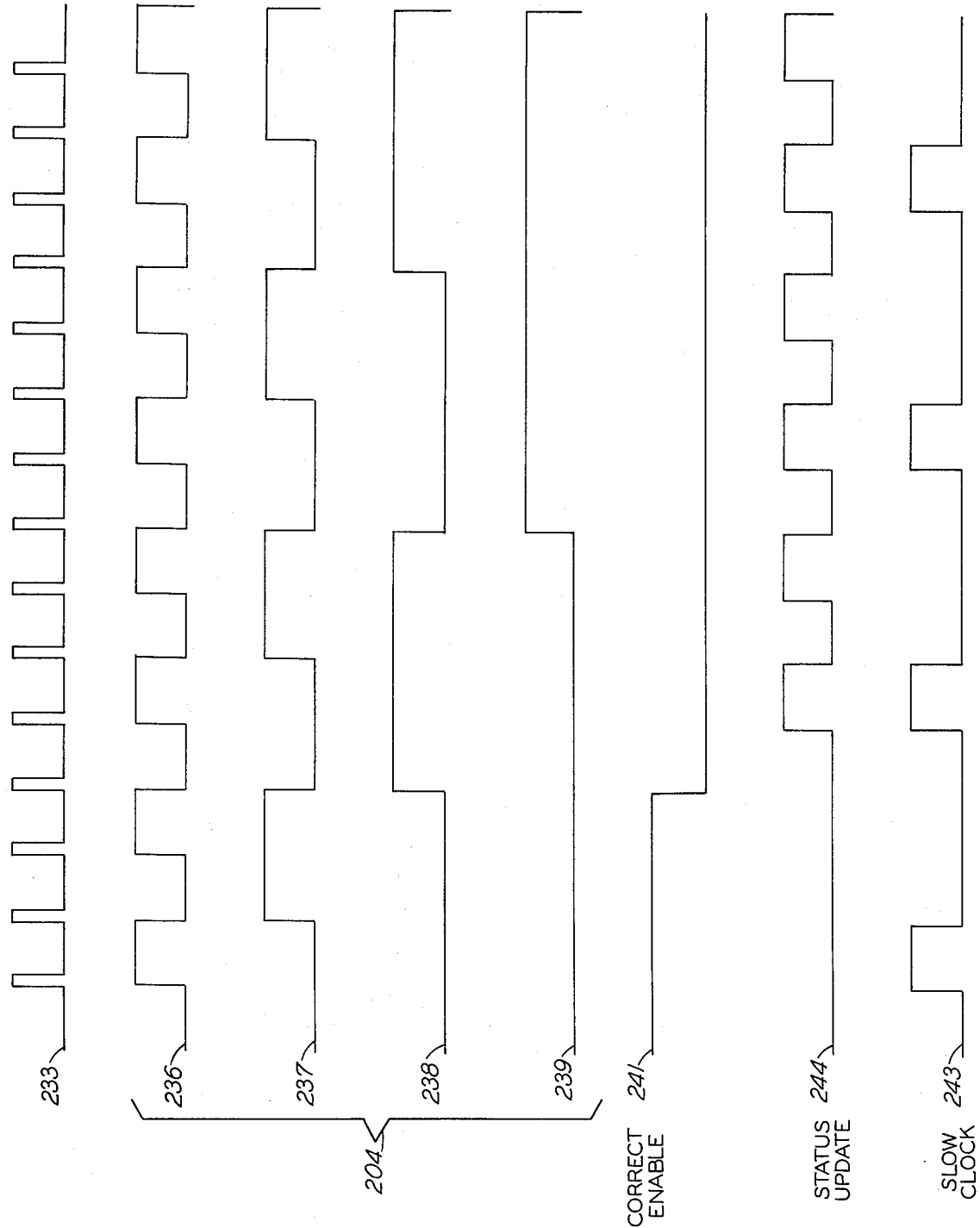
FIG. 9 is a timing diagram of some of the timing functions generated by the control unit of FIG. 8.

The decoding circuit 205 includes four NOR gates to generate desired clock sequence. Pulses appear on the four terminals 236, 237 238 and 239 of the counter 204. The lowest order of pulses, e.g., the fastest pulse rate appears on terminal 236. Each of the terminals 237–239 supplies a successively higher order of pulses, respectively. FIG. 9 shows the pulse signals as they appear on each of the respective pins of the counter 204 as the counter advances through a full count timing cycle.

The output signals on the terminals 238 and 239 of the counter 204 are combined in a NOR gate 241 to generate a high pulse lasting one fourth of the timing cycle. The quarter-cycle timing pulse or "correct-enable" pulse establishes a time slot for each of the control units 81 and 82 during which the roundness and thickness control signals are updated.

A second NOR gate 242 inverts the output of the terminal 236. The inverted output from the NOR gate 242 and the output from the terminal 237 of the counter 204 are applied to a third NOR gate 243. The output signal of the third NOR gate 243 is referred to as a slow clock signal.

The correct-enable signal is gated with the output signal from the second NOR gate 242 in a fourth NOR gate 244. The output signal from the fourth NOR gate 244 is referred to as the data flip-flop signal or status update signal. Referring to FIG. 9, the data flip-flop signal is disabled during the first quarter cycle of the counter 204 as long as the correct-enable pulse is present.

The rounding memory 207 includes two standard flip-flop logic circuits. The output leads 189 and 190 from the roundness control indicator circuit 166 are coupled to data input terminals of flip-flops 246 and 247, respectively. Clock pulses from the status update signal load the roundness or data signals from the roundness control indicator circuit 166 into the flip-flops 246 and 247. During the operation of the set 56 signals on both the leads 189 and 190 will remain high as long as the jacket 31 is uniformly thick within the established limits. After the data signals from the leads 189 and 190 have been loaded into the flip-flops 246 and 247, these data signals appear at the output terminals designated "Q" of the flip-flops 246 and 247. The inverted complement of each of the data signals appears on secondary output terminals of the flip-flops 246 and 247, designated "not Q" or "Q".

The inverted data signals from the flip-flops at terminals Q are gated into a NOR gate 251 which generates a high output signal as long as the jacket 31 is uniform within the established tolerances. The output signal from the NOR gate 251 is referred to hereinafter as "rounding-enable" signal.

The data signals from the Q terminals of the flip-flops 246 and 247 are applied directly to NOR gate 252 and 253 of the rounding logic circuit 208, respectively.

The signal outputs of these gates 252 and 253 are signal inputs of a symmetrical drive pulse generator circuit which is designated generally by the numeral 254. The drive pulse generator has two input and two output terminals, and each one of the output terminals of the gates 252 and 253 is coupled to one of the input terminals of the pulse generator circuit.

The operation of the drive pulse generator circuit 254 is controlled by the inverted correct-enable signal from a NOR gate 256. The signal from the gate 256 is one of the inputs to a NOR gate 257. During a first quarter of each timing cycle of the counter 204, the correct-enable signal remains high. Since the correct-enable signal is inverted and applied to the NOR gate 257, the low input signal to the gate 257 during the time period of the correct-enable pulse opens a window for signals applied to a second input terminal of the gate to pass through the gate. After the correct-enable pulse goes low its inverse applied to the gate 257 goes high, and the signal window of gate 257 closes.

The gate 257 receives timing pulses from external circuitry of the motor control circuit 57. This circuitry is commercially available and sold as control logic for stepping motors. The control circuit 57 provides timed pulses to drive corresponding motors 47 and 48. The rounding control unit 81 selectively reapplies these pulses to motor driven portions of the circuits 57. As long as the correct-enable pulse maintains the window of the gate 257 open, the pulses pass through the gate 257 and appear as input signals to each of the gates 252 and 253.

Whenever the jacket thickness remains uniform within the established tolerances, the second input signal to each of the gates 252 and 253 remains high, consequently the output signals from these gates remain low, blocking the pulse signals from reaching the drive pulse generator circuit 254.

Whenever there exists a nonuniform jacket thickness, for instance, the jacket thickness in the right and left hand quadrants is thicker than in the top and bottom quadrants by more than the established tolerance limits, a low output signal from the flip-flop 246 conditions the gate 252 to permit the pulses from the motor control circuit 57 to appear at the output terminal of the gate 252. When the gate 252 is conditioned and the correct-enable signal opens a signal window in the gate 257, the pulses from the motor control circuit 57 appear at the base of the transistor 258. The pulses are amplified by the transistor 258 and 259 and then applied through the output lead 261 to the motor control circuit 57.

Similarly, when the signal from the flip-flop circuit 246 remains high but the flip-flop circuit 247 applies a low signal to the gate 253, pulses from the motor control circuit pass, during the correct-enable signal period, through the gates 257 and 253. The pulses are, in turn, amplified by transistor 262 and 263 and then applied through a lead 264 to the motor control circuit 57. Pulses applied through the leads 264 to the circuit 57 control the rotation of the rounding motors 58 and 59 in one direction and pulses applied through the lead 261 control the rotation of the rounding motors in the other direction. The motors 58 and 59 controlled in this manner increase the pressure exerted by the rounding rollers 60 in one direction and a release of the pressure exerted by the rounding rollers in the direction perpendicular thereto.

The Thickness Control Unit 82

Figure 10:
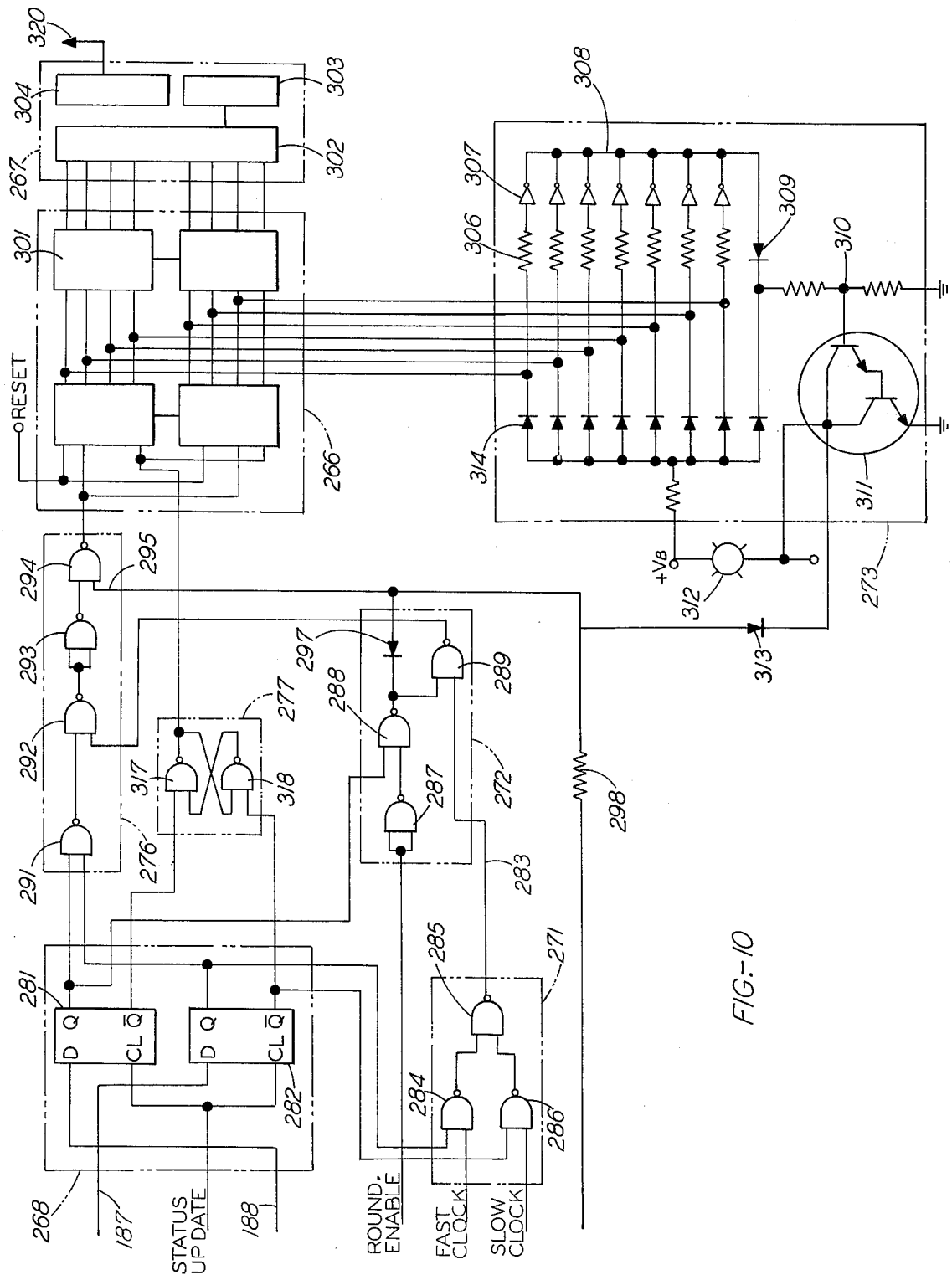
FIG. 10 is a schematic diagram of a thickness control unit of the control set of FIG. 4.

The thickness control unit 82, the circuits of which are illustrated more detailed in FIG. 10, controls the average jacket thickness of the cable by adjusting the speed at which the capstan 38 pulls the cable core 32 through the extruder 34. This speed is usually referred to as the line speed. The ultimate control signal supplied by the thickness control unit 82 to the speed control set 75 is an analog voltage signal which becomes either increasingly negative to slow down the line speed and increase the jacket thickness or it becomes increasingly positive to increase the line speed thereby decreasing the thickness of the extruded jacket 31.

Referring to FIG. 10, the analog voltage control signal is generated by applying clock pulses to an 8-bit binary counter 266 and then converting the existing count from the counter 266 to an anolog voltage signal in a commercially available digital to analog converter 267.

While the above statement briefly describes the general operation of the thickness control unit 82, reference to FIG. 4 more clearly illustrates the various functions of the control circuit 82. The binary decision or data signals are supplied to the thickness control indicator circuit 165 of the signal processing unit 78 to a thickness memory 268. The data signals from the circuit 165 indicate whether or not the average jacket thickness is maintained within the established limits or whether the thickness has increased above or below these limits. The already described status update signal locks the data signals into the memory 268. The data signals determine first of all whether the status of the counter is correct or whether it should be updated. Secondly, the data signals in the memory determine whether the counter is to count up or down. The data signals further determine the rate at which the counter 266 is to count.

The thickness of the jacket 31 is advantageously controlled at different rates, depending on whether the thickness exceeds or falls below the established range of value. When the jacket thickness exceeds the optimum desired value a quick correction is not critical. In fact, a slower downward correction of the jacket thickness is desirable since a quick correction may generate an undershoot below the minimum standard thickness of the jacket 31.

The roundness control unit 81, therefore, furnishes two sets of timing or clock signals to the roundness control unit 82. Fast clock signals are taken from the output terminal of the pulse shaper circuit 202. Slow clock signals are obtained from the output lead 243 of the decoding circuit 205. A clock select circuit 271 chooses either one or the other of these clock signals to update the counter 266.

Furthermore, a decrease of the overall jacket thickness is likely to decrease the thin portion of a nonuniform jacket 31 below the minumum standard thickness to generate a low quadrant alarm condition. Any downward thickness correction is, therefore, inhibited as long as a nonuniformity in the jacket thickness remains to be corrected. A rounding enable signal stops the selected clock signals in an upcount inhibit circuit 272 while the data signals to the roundness control unit 81 indicate a nonuniformity in the jacket thickness. The counter 266 is stopped even though the average jacket thickness is greater than the standard thickness.

Since the count in the counter 266 at any one time is directly proportional to the line speed control signal from the converter 267, an abrupt change in the count of the counter 266 causes a correspondingly abrupt change in the line speed. Such an abrupt change in the line speed occurs if the counter is permitted to count upward beyond its full count to reset to zero, or if the counter 266 is permitted to count downward beyond zero, so that the next count indicates a full count. To immobilize the counter 266 just prior to the occurrence of such an abrupt change, an over-range detector 273 samples the status of the counter 266 and blocks further updating of the counter. The over-range detector 273 disables further control of the jacket thickness and sends out, on a lead 274, an alarm signal to an external alarm circuit (not shown). The extrusion process, however, is not stopped since manual control of the extruder 34 is possible.

The signal output from the upcount inhibit circuit 272, the correct-enable signal and the output from the over-range detector circuit 273 are applied to a clock gate circuit 276 which is the final decision making gate in the application of the clock pulses to the counter 266.

An up-down control circuit 277 controls whether the counter 266 counts up or down. The circuit 277 receives two input signals from the thickness memory 268. A binary signal either high or low is applied from the circuit 277 directly to the counter 266. A high signal causes the counter 266 to count up while a low signal causes it to count down.

Referring now to FIG. 10, the thickness memory 268 includes two standard flip-flop logic circuits 281 and 282. Each of these flip-flop circuits has a data terminal for receiving data signals from the thickness control indicator circuit 165, a clock terminal, a data output terminal Q, and an inverted data output terminal Q.

The status update signal 281 and 282 loads data signals indicative of whether or not the jacket thickness is correct at the lower limit into the flip-flop circuit 281, and loads data signals indicative of whether or not the jacket thickness is correct at the upper limit into the flip flop circuit 282. When the jacket thickness is maintained within the established limits, the input signals to both flip-flop circuits 281 and 282 are high.

In disucssing the logic of the circuits 271, 272, 276 and 277 it should be noted that logic gates used in these circuits are customary NAND gates. The output signals of a NAND gate generates a high output signal in response to any low input signal to the gate. If all input signals to such a gate are high, then the output signal is low. Therefore, when a high signal is applied to one of the input terminals of a two-input NAND gate, the gate is enabled to pass pulsing signals applied to the other input terminal of the gate through the gate to its output terminal. On the other hand, a low signal applied to one of the input terminals fixes the output signal of the gate to a continuing high pulse, thereby blocking any pulse information applied to the other input terminal from appearing at the output terminal of the gate.

The clock select circuit 271 is a basic decision-making circuit which selects either the fast clock-signal from the output terminal of the pulse shaper circuit 202 or the slow clock signal from the NOR gate 243 to pass to an output lead 283. The fast clock signal is applied to one of the inputs of a two input NAND gate 284, the other input to the gate is coupled to the data terminal Q of the flip flop circuit 282. As long as the jacket thickness does not exceed the standard thickness value, the output signal on the terminal Q of the flip-flop circuit 282 remains high. Consequently, the fast clock signals applied to the gate 284, pass through the gate and become one of the inputs to the gate 285.

The slow clock signals are applied to the inputs to a gate 286. The other decision input signal to the gate 286 is the inverse data signal from the terminal Q of the flip-flop circuit 282. The output signal from the gate 286 is applied as the second input to the gate 285.

Since the inverted complement of the signal applied to the gate 284 is applied to the gate 286, only one of the two gates is enabled at any one time to pass the clock signals applied thereto. Thus, while one of the gates 284, 286 passes the clock signals applied to its input, the output of the other of the two gates remains high to (1) block the clock signals applied thereto, and (2) open the gate 285 to permit the selected clock signals from the other of the two gates 284, 286 to pass through the gate 285 to its output lead 283.

The slow clock signal is selected by the circuit 271 only when the data signal on the flip-flop circuit 282 indicates that the jacket thickness has exceeded its upper limit. At that time, the output signal from the flip-flop circuit 282 is low closing the gate 284 to the fast clock signals, and the inverse output signal from the terminal Q of the flip-flop circuit 282 is high to open the gate 286. The upcount inhibit circuit 272 blocks the clock signals from updating the counter 266 whenever the counter is in an upcount condition and rounding is taking place to correct a nonuniform jacket thickness. An upcount in the counter 266 corresponds to an increase voltage on the control signal output from the thickness control unit 82. The increased voltage, in turn, results in an increased line speed and in a thinner jacket. If, however, the jacket thickness is nonuniform when the average jacket thickness decreasing, a low quadrant condition may occur. The logic of the upcount inhibit circuit 272 consequently inhibits any controlled decrease of the average jacket thickness as long as the jacket thickness in adjacent quadrants is not equal within the selected limits.

Such a nonuniformity of the jacket thickness is indicated by a low output signal from the NOR gate 251 of the rounding memory 207. The output signal from the NOR gate 251 is applied to a first NAND gate 287 of the upcount inhibit circuit 272. A signal from the output terminal of the gate 251 or round-enable signal is applied to both input terminals of the gate 287. The gate 287, consequently, acts as an inverter of the round-enable signal. The output signal from the gate 287 is applied to one of the input terminals of a second NAND gate 288. The second input to the gate 288 is the data output signal Q from the flip-flop circuit 281, which is normally high except when the average jacket thickness decreases below the lower tolerance limit of the standard thickness range. The output signal from the gate 288 is applied as a decision making input to a third NAND gate 289 which then either passes or rejects the selected clock signals.

When both input signals to the gate 288 are high, its output signal is low. The low output signal applied to the gate 289 blocks any signals from passing therethrough. The gate 289 is in a signal blocking condition when the average jacket thickness is either too thick or within the standard thickness range, and when the jacket thickness is nonuniform.

However, when the data signals in the thickness memory 268 indicate that the average thickness is below the standard thickness range, increasing the average jacket thickness simultaneously with rounding the core 32 is desirable. Even though the round-enable signal tends to block the selected clock signals from passing through the gate 289 the effect of the round-enable signal is overridden by a load input signal from the data output terminal Q of the flip-flop circuit 281 to the gate 228. The low input singal of the gate 288 causes a high signal to be applied to the input of the gate 289 to permit the clock pulses to pass through the gate to the clock gate circuit 276.

The clock gate circuit 276 includes four NAND gates of which a first gate 291 selects a low signal from the data output terminals Q of either of the flip-flop circuits 281 or 282 to generate a high output signal. The output signal is applied as a decision signal to a second gate 292 to permit the clock signal from the circuit 272 to enter the clock gate circuit 276. A third gate 293 inverts the clock signals before they are applied to a first of the input terminals of a fourth gate 294. A second input terminal 295 is the decision terminal for the gate 294. A high signal applied to the terminal 295 opens the gate to permit the pulse signal applied to the first of its input terminals to update the counter 266.

The terminal 295 is coupled to the anode of a diode 297, the cathode of which is coupled to the output of the gate 288 of the upcount inhibit circuit 272. Consequently, when the output of the gate 288 is low the diode 297 is forward biased and the input signal on the terminal 295 to the gate 294 is low to produce a constant high signal on the output terminal of the gate 294. Consequently, any pulses are blocked from entering the counter 266. By coupling the upcount inhibiter circuit in this manner directly to the gate 294, the possibility of noise transmission to the counter 266 is minimized.

Another signal which effects the updating of the counter 266 is the correct-enable signal from the output of the gate 241 of the decoding circuit 205. The correct-enable signal is applied through an isolator resistor 298 to the input terminal 295 of the gate 294. Referring to the diagram of FIG. 9, the correct-enable signal at the output of gate 241 is high only during the first quarter of each timing cycle of the counter 204.

Referring to the terminal 236 of the counter 204, three signal transitions, either from low to high or from high to low, are encountered during the time that the correct-enable signal is high. Each of these transitions corresponds to a single clock output signal from the pulse shaping circuit 202. During the same time period of the correct-enable signal, only one pulse of the slow clock signal occurs at the output of the gate 243. These signals determinative of the extent to which the counter 266 is updated during each time period established by the counter 204, since the counter 266 updates its status on the basis of positive going signal transitions applied to its input terminal. As long as a constant high signal appears at the output of the gate 294, the status of the counter 266 cannot be updated.

The occurrence of the correct-enable signal on the input terminal 295 of the gate 294 conditions the gate 294 to apply clock signals to the counter 266. As the high correct-enable signal appears at the terminal 295, the output signal of the gate 294 undergoes a transition from high to low. As long as the correct-enable signal remains high, each positive-going transition of the output signal of the gate 294 updates the counter 266 by one.

FIG. 9 shows that there are three positive-going transitions of the fast clock from the output of gate 233. However, a fourth positive-going transition occurs at the end of each high correct-enable signal, since the negative-going transition of the correct-enable signal clamps the output signal of the gate 294 high to a constant high signal until the next correct-enable signal occurs. Consequently, four counter update pulses are received by the counter 266 during each correct-enable signal period in response to the fast clock signal.

During a similar correct-enable signal period only one positive-going transition of the slow clock signal from the output of the gate 243 occurs. However, again, a second positive-going transition occurs at the end of the high correct-enable signal. Consequently, during each correct-enable signal period during which the slow clock signal appears at the gate 294, the counter is updated by a total of two positive-going transitions.

After the high correct-enable signal has passed, no further correction is made during the remaining three-fourths of the timing cycle of the counter 204, by either the rounding control unit 81 or by the thickness control unit 82. The timing cycle of the counter 204 includes namely, two parts. The first is the just discussed correct-enable time, during which the control signals from both the roundness control unit 81 and the thickness control unit are altered.

The second part of the timing cycle is used to update data signals in each of the memory circuits 207 and 268. During this second part, the status update clock signals lock the thickness and roundness signals into these respective memories. It should also be noted, however, that only the last status update clock signal is of significance in that only the latest information in the thickness and roundness memories 268 and 207 respectively is considered to update the control signals from the units 82 and 81 during the next occurring correct-enable pulse.

The cycle time for the counter 204 is chosen to update the memory circuits 207 and 268 with updated data signals from the latest correct-enable period. In the preferred embodiment, line speed of approximately one foot per second and a spacing between the rounding mechanism 61 and the sensing means 42 of approximately 10 feet are determinative of the length of the timing cycle of the counter 204. A timing cycle of 15 to 16 seconds provides sufficient time delay between the correct-enable part and the end of the status update part of the timing cycle to load data signals into the memory circuits 207 and 268 which correspond to the latest corrected values of the jacket thickness. The counter 266 is a standard commercially available 8-bit binary up-down counter. It is connected to be reset initially to a 128-count. All output leads of the 8-count signals are coupled in parallel to the digital-to-analog or D/A converter 267. Since the counter operates on a positive supply voltage of 15 volt and the D/A converter operates on a positive supply voltage of only 5 volts a commercially available 15 to 5 volt shifter circuit is used as a buffer circuit in the output stage of the counter 266.

The D/A converter 267 includes a converter circuit 302. The converter circuit is a commercially available integrated circuit package, such as the one sold, for instance, by Motorola Inc. under the designation MC1408L–8. The converter circuit 302 is driven by such a conventional circuit 303 as recommended by the supplier of the converter circuit, such as for instance, one-half of a standard 723-type integrated circuit package. The D/A converter circuit 302 generates a current signal which is proportional in magnitude to the binary input from the counter 266. The current output signal from the converter 302 is preferably translated into a voltage signal. This is also done in accordance with a standard recommended amplifier circuit 304. This circuit is supplied by a second half of the commercially available 723-type integrated circuit package and supplemented with appropriate feedback resistors to an amplifier in the 723-type package to obtain a voltage output from the circuit 267 which varies preferably between 0 and 4 volts.

The over-range detector circuit 273 monitors the count of the counter 266 and sets up an alarm condition when, on an up-count, the counter reaches the count of 254, and when, on a down-count, it reaches the count of 1.

To recognize the low limit of the count each counter terminal except that of the lowest order is coupled through a resistor 306 into an input to inverters 307. Each of these inverters 307 have a commonly connected output terminal 308. As long as at least one of the input signals from the counter 266 is high, the output signal is low. However, when the counter 266 reaches the count of one, all sampled output signals from the counter 266 have reached a low state, and the output signal on the terminal 308 is high. The high signal is applied through a diode 309 to a voltage divider 310, the output of which is applied to the base of a standard transistor amplifier circuit 311.

The amplifier circuit 311 maintains a normally high collector voltage from a positive supply $V_B$ through a visual indicator 312. When the applied base signal turns the amplifier circuit 311 on, its collector voltage goes to ground. This ground or low signal is applied to the input terminal 295 of the gate 294 to block further counts from entering the counter 266. The resistor 298 isolates the low or high count danger signals from affecting the rounding control circuit 81 or from being affected thereby. A diode 313 blocks the normally high signal of the over-range detector circuit from interfering with the decision or gating signals applied to the terminal 295 during the normal operation of the circuit 82.

The low signal on the collector of the amplifier circuit 311 also causes a voltage drop across the indicator 312 to turn on the indicator as a visual means for identifying the existing danger condition. The low signal from the collector of the amplifier circuit is further applied to the output lead 274, which supplies a ready connection terminal to any convenient alarm signal device.

A high count of 254 is recognized by a conventional diode AND gate 314 which samples seven of the eight output signals of the counter 266. The output signals of the lowest order are again disregarded, so that as the counter 266 reaches the count of 254 all input signals to the AND gate 314 are high, and a high signal is again applied to the base of the amplifier circuit 311. The resulting output function has been described with respect to the low count danger condition. In either case, whether the count 266 reaches a high or a low count limit, the amplifier circuit 311 is turned on and the low signal on the terminal 295 of the gate 294 blocks further updating of the counter 266.

The output signal of the up-down control circuit 277 is applied directly to the counter 266 to establish whether the counter is to count up or down. The up-down control circuit 277 includes two NAND gates 317 and 318 which are connected into a latching circuit. The inverted output signal Q from the flip-flop circuit 281 is an input to the gate 317. The inverted output signal Q from the flip flop circuit 282 is applied as an input to the gate 318. Whenever the jacket thickness is within tolerance limits the input signals from the respective flip-flop circuits to each of the gates 318 and 317 are low, and the output signal from the gate 317 is high. The output signal from the gate 317 is the output signal of the circuit 277 and is applied directly to the up-down control of the counter 266 wherein a high signal establishes an up-count, whereas a low signal establishes a down-count.

A high input signal from the flip-flop circuit 281 indicates that the jacket thickness has fallen below the standard thickness range and the counter should become conditioned to count down to slow the line speed and thereby, to increase the average jacket thickness. The low input signal from the flip-flop circuit 282 results in a high output signal from the gate 318. The high output signal from the gate 318 appears as an input signal to the gate 317. Consequently, two high input signals appear at the gate 317 and its output signal becomes the desired low signal which is then applied to the counter 266.

When the jacket thickness has increased above the preselected thickness range the input signal from the flip-flop circuit 281 to the gate 317 is low and the input signal from the flip-flop circuit 282 to the gate 318 is high. The low input from the flip-flop circuit 281 to the gate 317 generates a high output from the circuit 277 which is applied to the counter 266 to condition it for an up count.

The previously described D/A converter circuit 267 including the recommended circuit 304 has an output which ranges approximately from 0 to 4 volts depending, of course, on the multiplication factor given to the standard amplifier of the 723-type integrated circuit package. The range of this output signal may, of course, be changed as desired depending on what type of control signal of the speed control set 75 is modified. For instance, its voltage range may be increased or decreased in a conventional manner as, for instance, by using a conventional amplifier circuit. Also, its voltage may be shifted with respect to ground, either by a standard biasing circuit or by the use of an amplifier circuit. Any such modifications are possible within the scope and spirit of the invention.

An alternate embodiment of the thickness control unit basically varies from the mode of operation of the described thickness control unit 82. Consequently, the alternate embodiment is described in greater detail as follows.

Alternate Embodiment of the Thickness Control Unit 82

Figure 11:
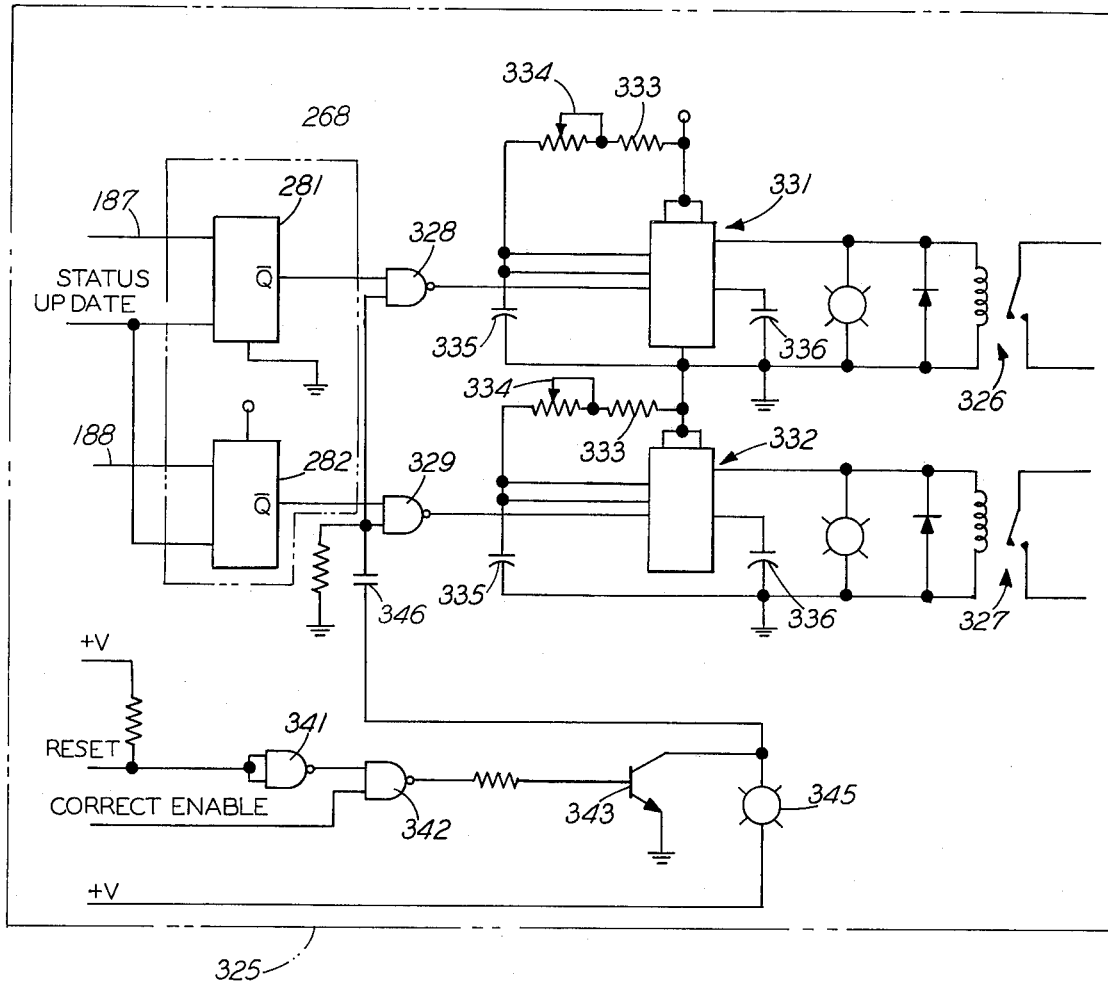
FIG. 11 is an alternate embodiment of the control unit of FIG. 10.

Referring to FIG. 11, an alternate embodiment of the control unit 82, designated generally by the numeral 325, is specifically adapted to generate control signals for the speed control set 75 when the set 75 regulates the line speed by hydraulic means. Hydraulically controlling a line speed of the capstan 38 is well known in the art. Consequently, the thickness control unit 325 is a significant alternate embodiment to the control unit 82 previously described.

In general, when the speed of the capstan 38 is controlled hydraulically, a setting of a hydraulic valve (not shown) controls the line speed. Consequently, coupling a motor to such a valve to open the valve in response to the rotation of the motor in one direction, and to close the valve in response to the rotation of the motor in the other, results in either increasing or decreasing the line speed.

The thickness control unit 325 shown in FIG. 11 generates timed energization pulses across the coil of either one of two relays 326 or 327. These pulses operate the motor which controls the hydraulic valve setting in the speed control set 75 to either close the valve or to open it, respectively. The data input signals to the thickness control unit 325 appear at the input terminals of two conventional flip-flop logic circuits which correspond to the logic circuits 281 and 282 of the thickness memory 268, respectively. The data signals are loaded into each of these flip-flop circuits 281 and 282 by the status update signal previously described.

The inverted output signal from the terminal Q of each of these flip-flop circuits 281 and 282 is applied to a first input terminal of NAND gates 328 and 329, respectively. The output signals of each of these gates 328 and 329 are directly applied to commercially available 555-type integrated timer circuits 331 and 332, respectively. Each of these circuits 331 and 332 is connected to external elements such as a resistor 333, a potentiometer 334 and two capacitors 335 and 336 in accordance with a supplier-recommended circuit to form what is generally referred to as a "one-shot" circuit. The one-shot circuits 331 and 332 generate an output signal pulse of predetermined length in response to a positive transition of an input signal to the circuits. The duration of the pulse is determined by the particular values of the elements of the recommended circuit. The length of the output pulse from each of the circuits 331 and 332 is particularly variable by a change in the value of the potentiometer 334.

When the control set 56 is in operation, the input signal to the gate 341 is normally low such that its output signal applied to a first terminal of the gate 342 enables the gate 342 to apply a variable signal, received at a second terminal of the gate 342 to the base of a transistor 343. The second terminal of the gate 342 receives the correct-enable signal and applies the inverse thereof to the base of the transistor 343. As long as the correct-enable pulse is low, the transistor 343 remains turned on, driving the collector terminal of the transistor 343 to ground. When, at the beginning of the timing cycle of the counter 204, a correct-enable signal goes high, the signal at the base of the transistor 343 goes low and turns off the transistor.

The collector terminal of the transistor 343 is biased through an indicator 345. When the transistor 343 turns off, a capacitor 346 charges until its voltage equals the bias voltage applied through the indicator 345. The charging capacitor 346 applies a positive-going pulse to the second input terminals of the gages 328 and 329.

If at the time of receiving a pulse from the charging capacitor 346 either one of the gates 328 or 329 is enabled to pass signals, such a gate 328 or 329 will pass the pulse from the charging capacitor 346 to the input terminals of the respective timer circuits 331 and 332. The negative-going transition of the pulse generated by the charging capacitor 346 results in a positive-going transition of the input signal applied to either of the circuits 331 or 332 trigger the respective one of the circuits.

If, for instance, the jacket thickness has fallen below the established thickness range, the input signal to the flip-flop circuit 281 is low and the input signal to the flip-flop signal 282 remains high. Consequently, the output signal from the flip-flop circuit 282 applied to the gate 329 is low clamping the output signal of the gate 329 high, and blocking any signals from passing through the gate. However, the low input signal to the flip-flop circuit 281 causes a high signal to be applied to the first input terminal of the gate 328. This high input signal enables the gate, so that the pulse generated by the charging capacitor 346 passes through the gate 328 and is applied to the circuit 331. The applied signal triggers the circuit 321 and, for a time period determined by the setting of the potentiometer 334, a current passes through the relay 326, closing for such a predetermined length of time the relay.

As a result of the relay 326 being closed, the motor which controls the valve in the hydraulically operated speed control set 75 closes the valve by an amount which is determined by the length of the pulse through the relay 326. Ultimately, the line speed slows down to increase the thickness of the jacket 31.

Similarly, when the jacket thickness is greater than the standard jacket thickness, the gate 329 is enabled and applies the pulse generated by the charging capacitor 346 to the circuit 332. The circuit 332 activates the relay 327 for a predetermined length of time, which, in turn, causes the valve control motor to rotate in a direction to open the valve to thereby speed up the line.

At the termination of the correct-enable signal, the transistor 343 again turns on and the collector terminal of the transistor goes to ground. This causes the capacitor 346 to discharge and apply a pulse of negative polarity to the gates 328 and 329. While such a condition is not ideal, a diode in the input leads to each of the gates 328 and 329 merely causes the gates to disregard the pulse of negative polarity.

While the invention has been described with respect to a specific embodiment thereof and an alternate embodiment of the thickness control unit, it should be realized that other embodiments of the invention are possible without departing from the scope and spirit of the invention. The invention is intended to be limited only by the following claims.

What is claimed is:

1. A method of extruding an elongated annular article, wherein a first mechanism controls the uniformity of the wall thickness of diametrically opposite quadrants of the article with respect to the wall thickness of the quadrants adjacent thereto, and a second mechanism controls the average value of the wall thickness of the four quadrants of the article, the method comprising:

generating first and second signals indicative, respectively, of
a. an increase of the average value of the wall thickness in diametrically opposite quadrants of the article with respect to the average value of the wall thickness in the other two quadrants beyond a predetermined acceptable range, and
b. a deviation of the average value of the wall thickness from a predetermined thickness range;
applying the first signals to the first mechanism to increase the uniformity of the wall thickness;
applying the second signals to the second mechanism to change the average thickness of the article to a value within the thickness range; and
blocking the second signals from being applied to the second mechanism upon the average wall thickness exceeding the predetermined thickness range while the first signals are being applied to the first mechanism.

2. A method of claim 1 further comprising:
generating third signals indicative of the wall thickness having a value less than a predetermined minimum value in at least one of the quadrants;
blocking the second signals from being applied to the second mechanism upon the average wall thickness exceeding the values of the predetermined thickness range, while the third signals indicate that the wall thickness in at least one of the quadrants has a value less than the minimum value; and
applying the third signals to the second mechanism to further increase the average wall thickness of the article.

3. A method according to claim 2, wherein generating the first signals comprises:
generating positive and negative signals corresponding to upper and lower limits of the predetermined acceptable range of values of the average wall thickness of any two diametrically opposite quadrants of the article with respect to the average wall thickness of the other two quadrants;
subtracting the average value of signals corresponding to the wall thickness of the article in two quadrants diametrically opposite one another from the average value of signals corresponding to the wall thickness in the other two mutually opposite quadrants;
comparing the difference between the average value of such signals to the signals corresponding to the upper and lower limits to determine the value of the difference in relation to such limits; and
generating pulsed signals of a first polarity when the value of the difference is more positive than the upper limit, and of a second polarity when such value is more negative than the lower limit.

4. A method according to claim 3, wherein the article is a jacket extruded about a cable core, wherein the first mechanism includes two pairs of rounding rollers, each pair engaging opposite sides of the core along an axis perpendicular to the longitudinal axis of the core and perpendicular to the axis along which the other pair of rollers engages the core, and wherein applying the first signals to the first mechanism comprises:
applying the pulsed signals to at least one stepping motor mounted to move one pair of rounding rollers toward the core and the other pair away from the core; and
altering the cross-sectional shape of the core with respect to an extrusion orifice to increase the jacket thickness in quadrants along a first axis of a cross section through the jacket with respect to the jacket thickness in quadrants along a second axis of the cross section perpendicular to the first axis in response to the signals of the first polarity, and to decrease the jacket thickness in quadrants along the first axis with respect to the jacket thickness in quadrants along the second axis in response to the signals of the second polarity.

5. A method according to claim 3, wherein generating the second signals comprises:
generating signals corresponding to upper and lower limits of the thickness range;
averaging the values of the signals corresponding to the wall thickness of the article in each of the quadrants thereof;
comparing the resulting average value of such thickness signals to the values of te signals of the upper and lower limits of the thickness range;
applying pulses to a counter to increase the count of the counter when the average value of the thickness signals exceeds the value of the upper limit, and to decrease the count of the counter when the average value of the thickness signals is less than the value of the lower limit; and
converting the count of the counter to analog signals corresponding to the second signals.

6. A method of controlling the wall thickness of an anular extruded article, including controlling the uniformity of the wall thickness of the article by a first mechanism, and controlling the average wall thickness of the article by a second mechanism, the method comprising:
generating first control signals in response to a dispartiy between the wall thickness in adjacent quadrants of the article, the disparity exceeding a predetermined tolerance range;
generating second control signals of a first type in response to an increase of the average wall thickness of the article above a predetermined thickness range and of a second type in response to a decrease of the average wall thickness below the thickness range;
applying the first control signals to te first mechanism to render the first mechanism effective to reduce the disparity between the wall thickness in adjacent quadrants and thereby increase the uniformity of the article;
applying the second signals to the second mechanism to render the second mechanism effective to change the average wall thickness to a value within the predetermined thickness range; and
blocking the second signals of the first type from being applied to the second mechanism while the first signals are being applied to the first mechanism, whereby the average wall thickness is prevented from being decreased while the uniformity of the wall thickness is outside of the predetermined tolerance range.

7. A method according to claim 6, further comprising:
generating a timing cycle including first and second timing periods;
generating first and second intermediate signals indicative, respectively of a. a disparity between the wall thickness in the adjacent quadrants of the article, b. an increase or decrease of the average wall thickness beyond the predetermined thickness range;

updating first and second data memories by storing the first and second intermediate signals in the first and second data memories, respectively during each of the first timing periods; and generating the first and second control signals from the first and second intermediate signals, respectively, and applying such generated control signals to the respective mechanisms during each of the second timing periods.

8. A method according to claim 7, further comprising:

generating third intermediate signals upon the wall thickness in any of the quadrants becoming less than a predetermined minimum thickness;

increasing, in response to the presence of third intermediate signals, the frequency of the timing cycle; and overriding, in response to the presence of the third intermediate signals, the second intermediate signals, and storing in the second data memory signals which are indicative of the average wall thickness being less than the predetermined thickness range.

9. Apparatus for extruding an elongated annular article, including a means for mechanically controlling the uniformity of the wall thickness of diametrically opposite quadrants of the article with respect to the wall thickness of the quadrants adjacent thereto, and means for mechanically controlling the average value of the wall thickness of the four quadrants of the article, wherein an improvement comprises:

means for generating first and second signals indicative, respectively, of a. an increase of the average value of the wall thickness in diametrically opposite quadrants of the article with respect to the average value of the wall thickness in the other two quadrants beyond a predetermined acceptable range of values, and b. a deviation of the average value of the wall thickness from a predetermined thickness range;

means, coupled to the means for mechanically controlling the uniformity of the wall thickness, for translating the first signals into mechanical motion;

means for applying the first signals to the signal translating means to increase the uniformity of the wall thickness;

means for applying the second signals to the means for controlling the average wall thickness to alter the operation thereof and to change the average thickness of the article to a value within the thickness range; and means rendered effective upon the average wall thickness exceeding the values of the thickness range while the first signals are being applied to the signal translating means for blocking the second signals from being applied to the means for controlling the average wall thickness.

10. An improvement according to claim 9 further comprising:

means for generating third signals indicative of the wall thickness having a value less than a predetermined minimum value in at least one of the quadrants;

means rendered effective upon the average wall thickness exceeding the values of the thickness range while the third signals are indicating that the wall thickness in at least one of the quadrants has a value less than the minimum value for blocking the second signals from being applied to the means for controlling the average wall thickness.

11. An improvement according to claim 10, wherein the means for generating the first and second signals comprises:

means for generating positive and negative signals corresponding to upper and lower limits of the predetermined acceptable range of values of the average wall thickness of any two diametrically opposite quadrants of the article with respect to the average wall thickness of the other two quadrants;

means for subtracting the average value of signals corresponding to the wall thickness of the article in two quadrants diametrically opposite one another from the average value of signals corresponding to the wall thickness in the other two mutually opposite quadrants;

means for comparing the difference between the average value of such signals to the signals corresponding to the upper and lower limits to determine the value of the difference in relation to such limits; and means for generating the first signals of a first polarity when the value of the difference is more positive than the upper limit, and of a second polarity when such value is more negative than the lower limit.

12. An improvement according to claim 11, wherein the means for generating the first and second signals further comprises:

means for generating signals corresponding to upper and lower limits of the thickness range;

means for averaging the values of the signals corresponding to the wall thickness of the article in each of the quadrants thereof;

means for comparing the resulting average value of such thickness signals to the values of the signals of the upper and lower limits of the thickness range;

a counter coupled to the thickness range comparing means;

means for increasing the count of the counter when the average value of the thickness signals exceeds the value of the upper limit, and for decreasing the count of the counter when the average value of the thickness signals is less than the value of the lower limit; and means for converting the count of the counter-to-analog signals coresponding to the second signals.

13. Apparatus for controlling the wall thickness of an annular extruded article, including a first mechanism for controlling the uniformity of the wall thickness of the article, and a second mechanism for controlling the average wall thickness of the article, the apparatus comprising:

means for generating first control signals in response to a disparity between the wall thickness in adjacent quadrants of the article, the disparity exceeding a predetermined tolerance range;

means for generating second control signals of a first type in response to an increase of the average wall thickness of the article above a predetermined tolerance range;

means for generating second control signals of a first type in response to an increase of the average wall thickness of the article above a predetermined thickness range and of a second type in response to a decrease of the average wall thickness below the thickness range;

means for applying the first control signals to the first mechanism to render the first mechanism effective to reduce the disparity between the wall thickness in adjacent quadrants to, thereby, increase the uniformity of the article;

means for applying the second signals to the second mechanism to render the second mechanism effective to change the average wall thickness to a value within the predetermined thickness range; and means for blocking the second signals of the first type from being applied to the second mechanism while the first mechanism has been rendered effective, the blocking means preventing the average wall thickness from being decreased while the uniformity of the wall thickness is outside of the predetermined tolerance range.

14. Apparatus according to claim 13, further comprising:

means for generating a timing cycle including first and second timing periods;

first and second data memories;

means for generating first and second intermediate signals indicative respectively of a. a disparity between the wall thickness in the adjacent quadrants of the article, b. an increase or decrease of the average wall thickness beyond the predetermined thickness range;

means, rendered effective during each of the first timing periods, for updating first and second data memories with the first and second intermediate signals, respectively; and means, rendered effective during each of the second timing periods, for generating the first and second control signals in response to the signals from the first and second memories, respectively, and for applying such generated control signals to the respective mechanisms during each of such second timing periods.

15. Apparatus according to claim 14, further comprising:

means for generating third intermediate signals, rendered effective upon the wall thickness in any of the quadrants becoming less than a predetermined minimum thickness;

means, response to the third intermediate signals, for increasing the frequency of the timing cycle; and means, response to the third intermediate signals, for overriding the second intermediate signals and for updating the second memory with signals indicative of the average wall thickness being less than the predetermined thickness range.

* * * * *